US011216032B2

(12) United States Patent
Ushijima et al.

(10) Patent No.: US 11,216,032 B2
(45) Date of Patent: Jan. 4, 2022

(54) INFORMATION READING APPARATUS

(71) Applicant: DENSO WAVE INCORPORATED, Aichi-pref. (JP)

(72) Inventors: Takao Ushijima, Chita-gun (JP); Makoto Ootake, Chita-gun (JP); Keiichiro Yamamoto, Chita-gun (JP); Masaru Hashimoto, Chita-gun (JP); Katsunori Sakakibara, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 16/395,566

(22) Filed: Apr. 26, 2019

(65) Prior Publication Data
US 2020/0005007 A1    Jan. 2, 2020

(30) Foreign Application Priority Data

Apr. 27, 2018   (JP) ............................. JP2018-086409
Feb. 19, 2019   (JP) ............................. JP2019-027433

(51) Int. Cl.
*G06F 1/16*      (2006.01)
*G06K 7/10*      (2006.01)

(52) U.S. Cl.
CPC .............. *G06F 1/1632* (2013.01); *G06F 1/16* (2013.01); *G06F 1/1613* (2013.01); *G06F 1/1633* (2013.01); *G06F 1/1684* (2013.01); *G06K 7/1098* (2013.01); *G06K 7/10881* (2013.01); *G06F 1/1607* (2013.01); *G06F 1/1656* (2013.01)

(58) Field of Classification Search
None
See application file for complete search history.

(56) References Cited

U.S. PATENT DOCUMENTS

| 5,410,141 A * | 4/1995 | Koenck ............... G06K 7/10584 235/472.02 |
| 5,530,619 A | 6/1996 | Koenck et al. |
| 8,346,979 B1 | 1/2013 | Lee |
| 2006/0105722 A1 * | 5/2006 | Kumar .................. G06F 1/1632 455/90.3 |

(Continued)

FOREIGN PATENT DOCUMENTS

| CN | 204229413 U | 3/2015 |
| JP | 2004-005164 A | 1/2004 |

(Continued)

*Primary Examiner* — Christle I Marshall
(74) *Attorney, Agent, or Firm* — Oliff PLC

(57) ABSTRACT

An information reading apparatus that is easy for a user to operate even if different functions are required for each situation is provided. A base module includes a control unit which performs control by using three functional modules assembled thereto, that is, a top module, a bottom module, and a back module, and a touch panel whose display content is controlled by the control unit. The top module is connected to a one end of the base module in the longitudinal direction, the bottom module is connected to the other end of the base module in the longitudinal direction, and the back module is connected to a rear side of the base module, which faces away from a display screen of a touch panel. The control unit recognizes each function on the basis of the information obtained from the three functional modules connected to the base module.

20 Claims, 27 Drawing Sheets

(56) References Cited

U.S. PATENT DOCUMENTS

| | | | |
|---|---|---|---|
| 2008/0142603 A1 | 6/2008 | Mynhardt | |
| 2008/0259551 A1* | 10/2008 | Gavenda | G06F 1/1656 |
| | | | 361/679.31 |
| 2013/0109316 A1* | 5/2013 | Lee | G06F 1/1626 |
| | | | 455/41.2 |
| 2013/0221099 A1 | 8/2013 | Kitagawa | |
| 2014/0233180 A1* | 8/2014 | Vargas | G06F 1/1613 |
| | | | 361/679.55 |
| 2014/0347000 A1* | 11/2014 | Hamann | G06F 1/1626 |
| | | | 320/103 |
| 2016/0055357 A1* | 2/2016 | Hicks | G06K 7/0004 |
| | | | 235/383 |

FOREIGN PATENT DOCUMENTS

| | | | | |
|---|---|---|---|---|
| JP | 2011029943 A | * | 2/2011 | ......... H04M 1/0254 |
| JP | 2011029944 A | * | 2/2011 | ......... H01Q 1/1235 |

* cited by examiner (A)

(B)

INFORMATION READING APPARATUS

CROSS-REFERENCE TO RELATED APPLICATION

This application is based on and claims the benefit of priorities from earlier Japanese Patent Applications No. 2018-086409 filed Apr. 27, 2018 and No. 2019-027433 filed Feb. 19, 2019, the descriptions of which are incorporated herein by reference.

BACKGROUND

Technical Field

The present invention relates to information reading apparatuses which are able to read information from information carriers such as one-dimension information codes, two-dimensional information codes, or RFID tags.

Related Art

Optical information reading apparatuses such as an optical information reading apparatus that optically reads an information code and information reading apparatuses such as an RFID tag reader/writer that reads an RFID tag in a non-contact manner are required to perform various functions according to situations such as distribution, storage, and in-store sales. There have been known information reading apparatuses that can perform such various functions. For example, an optical information reading apparatus disclosed in JP-A-2004-005164 is known. This information reading apparatus includes a hand-held bar code reader, a PDA, and a receptacle that holds the PDA placed thereon to be connected to the bar code reader, with these components being separably or detachably combined together, and is configured, in a combined state, to serve as a bar code handy terminal that performs functions such as reading of the bar code, and processing and collection of the read data.

PRIOR ART REFERENCE

Patent Document

[PTL 1] JP 2004-005164 A

The information reading apparatuses described above are suitably used according to the situations such as distribution and inventory, and dedicated models for each situation, which are completely different from each other, are often used. For example, it is assumed that, in the distribution process, a QR code reader of company A is used to read QR codes (registered trademark) displayed in units of transport pallets for transporting products or the like, and in the inventory process at in-store or the like, an RFID tag reader/writer of company B is used to read RFID tags attached to the products or the like. It is further assumed that, in the distribution warehouse in the distribution process, a QR code reader of company C is used to read QR codes attached to the packing boxes or the like, which are placed on the upper shelf, from a distant position.

In the case of collective management from distribution to retailing, which has recently increased, the types of devices used for reading information differ depending on each situation. This may cause inconvenience in use. For example, as part of collective management, a user in charge of reading using an RFID tag reader/writer in inventory work in the store or the like may read QR codes attached to packing boxes or the like stored in a warehouse by using a QR code reader. In such a case, since the operation of the RFID tag reader/writer is different from the operation of the QR code reader, the user may feel inconvenience in use. This problem is not limited to the operability of the application program which is implemented in reading the information. For example, only a difference in arrangement of keys may cause the user to feel inconvenience in use.

SUMMARY

It is thus desired to provide an information reading apparatus that is easy for a user to operate even if different functions are required for each situation.

In order to achieve the above object, an aspect of the disclosure is an information reading apparatus including: a base module; and three functional modules, which are a top module, a bottom module, and a back module, each configured to be connected to the base module to impart a predetermined function, wherein the base module includes a control unit that performs control by using the three functional modules, and a display unit whose display content is controlled by the control unit, the top module is connected to a one end of the base module in a longitudinal direction of the base module, and includes at least one of a first reading unit for reading external information and a sound unit, the bottom module is connected to an other end of the base module in the longitudinal direction of the base module, and includes at least one of a second reading unit for reading external information, a key operation unit, and a battery unit, the back module is connected to a rear side of the base module, which faces away from a display screen of the display unit, and includes at least one of a third reading unit for reading external information, an antenna, a charging unit, and a grip, and the control unit recognizes each function on a basis of information obtained from the three functional modules connected to the base module.

The reference signs in parenthesis indicate the corresponding relationship with the specific elements in the embodiments described below.

According to the above aspect of the disclosure, the base module includes the control unit that performs control by using three functional modules, which are the top module, the bottom module, and the back module, assembled to the base module, and the display unit whose display content is controlled by the control unit, wherein the top module is connected to the one end of the base module in the longitudinal direction, and includes at least one of the first reading unit for reading external information and the sound unit, the bottom module is connected to the other end of the base module in the longitudinal direction, and includes at least one of the second reading unit for reading external information, the key operation unit, and the battery unit, and the back module is connected to the rear side of the base module, which faces away from the display screen of the display unit, and includes at least one of the third reading unit, the antenna, the charging unit, and the grip. The control unit recognizes each function on the basis of the information obtained from the three functional modules connected to the base module.

Thus, the three functional modules each having a function appropriate for the intended situation are connected to the base module, for example, separably or detachably in terms of mechanical and electrical connection, such that a predetermined function or a further function to the connected functional module is controlled by the control unit. In particular, the functional modules and a plurality of application programs provided for implementation of respective functions can be designed based on a common design concept, and thus operation methods, key arrangement, display content during operation, and the like can be readily commonized. Accordingly, an information reading apparatus that is easy for a user to operate even if different functions are required for each situation can be achieved.

According to the above aspect of the disclosure, when the power is applied, the control unit recognizes each function on the basis of the information obtained from the three functional modules connected to the base module. Since the power is usually applied after the respective functional modules are connected to the base module, functions of the connected functional modules can be reliably recognized.

According to the above aspect of the disclosure, one of the first reading unit, the second reading unit, and the third reading unit serves as a wireless communication unit for reading external information by using wireless communication, and the control unit receives the external information from the wireless communication unit when the external information is read by the wireless communication unit, without providing instruction to the wireless communication unit. Thus, once the control unit first recognizes the wireless communication unit, subsequent instructions to the wireless communication unit are not necessary. Accordingly, load on communication processing by the control unit can be reduced.

According to the above aspect of the disclosure, the control unit controls the notification unit to perform first notification when connection of at least one of the top module, the bottom module, and the back module to the base module is not recognized. Accordingly, when the first notification is performed by the notification unit, a connection failure state, in which at least one of the top module, the bottom module, and the back module is not connected to the base module, can be easily recognized, and the connection failure can be immediately removed.

According to the above aspect of the disclosure, the control unit controls the notification unit to perform second notification when the function imparted by the top module, the function imparted by the bottom module, and the function imparted by the back module becomes a combination of predetermined functions. Accordingly, a combination that should be excluded, which is a combination by which incompatible functions are imparted, is set as the combination of predetermined functions so that the combination that should be excluded can be easily recognized and immediately removed when the second notification is performed by the notification unit.

According to the above aspect of the disclosure, the control unit controls the display unit to display the application program for performing the recognized function in a selectable manner and not to display the application program for performing the unrecognized function among the plurality of application programs stored in the storage unit in an executable manner. Thus, since the application program for performing a function different from a function imparted by the connected functional module is not displayed on the display unit, erroneous operation is prevented for improved operability.

According to the above aspect of the disclosure, the base module includes at least one of a battery mounting unit and a base module key operation unit in addition to the control unit and the display unit. Accordingly, an information reading apparatus that is easy for a user to operate even if the base module is multifunctionalized.

According to the above aspect of the disclosure, the top module includes at least one of the first reading unit, the sound unit, a top module key operation unit, a sensor, a top module vibrator, and an illumination unit. Accordingly, an information reading apparatus that is easy for a user to operate even if the top module is multifunctionalized.

According to the above aspect of the disclosure, the bottom module includes at least one of the second reading unit, the key operation unit, the battery unit, a bottom module sound unit, a battery cover opening detection unit, and a small protection unit. Accordingly, an information reading apparatus that is easy for a user to operate even if the bottom module is multifunctionalized.

According to the above aspect of the disclosure, the back module includes at least one of the third reading unit, the antenna, the charging unit, the grip, a back module battery unit, and a back module vibrator. Accordingly, an information reading apparatus that is easy for a user to operate even if the back module is multifunctionalized.

According to another aspect of the disclosure, the base module includes at least one of a base module display unit whose display content is controlled by a control unit, a battery mounting unit, and a base module key operation unit in addition to a control unit that performs control by using a plurality of functional modules including at least a first functional module and a second functional module. Further, the first functional module is connected to the base module, and includes at least one of a first reading unit for reading external information, a first display unit, a first sound unit, a first key operation unit, a first sensor, a first vibrator, a first illumination unit, a first battery unit, a first battery cover opening detection unit, a first small protection unit, a first antenna, a first charging unit, and a first grip, and the second functional module is connected to the base module, and includes at least one of a second reading unit for reading external information, a second display unit, a second sound unit, a second key operation unit, a second sensor, a second vibrator, a second illumination unit, a second battery unit, a second battery cover opening detection unit, a second small protection unit, a second antenna, a second charging unit, and a second grip. The control unit recognizes each function on a basis of information obtained from the plurality of functional modules connected to the base module.

Thus, a plurality of functional modules each having a function appropriate for the intended situation are connected to the base module such that a predetermined function or the like corresponding to the connected functional module is controlled by the control unit. In particular, the functional modules and a plurality of application programs provided for implementation of respective functions can be designed based on a common design idea, and thus operation methods, key arrangement, display content during operation, and the like can be readily commonized. Accordingly, an information reading apparatus that is easy for a user to operate even if different functions are required for each situation can be achieved.

BRIEF DESCRIPTION OF THE DRAWINGS

In the accompanying drawings:

FIG. 6 illustrates an assembled state of an information reading apparatus 1b, in which a part (A) of FIG. 6 is a plan view, a part (B) of FIG. 6 is a side view, and a part (C) of FIG. 6 is a front view, which;

DETAILED DESCRIPTION OF THE PREFERRED EMBODIMENTS

First Embodiment

Figure 1:
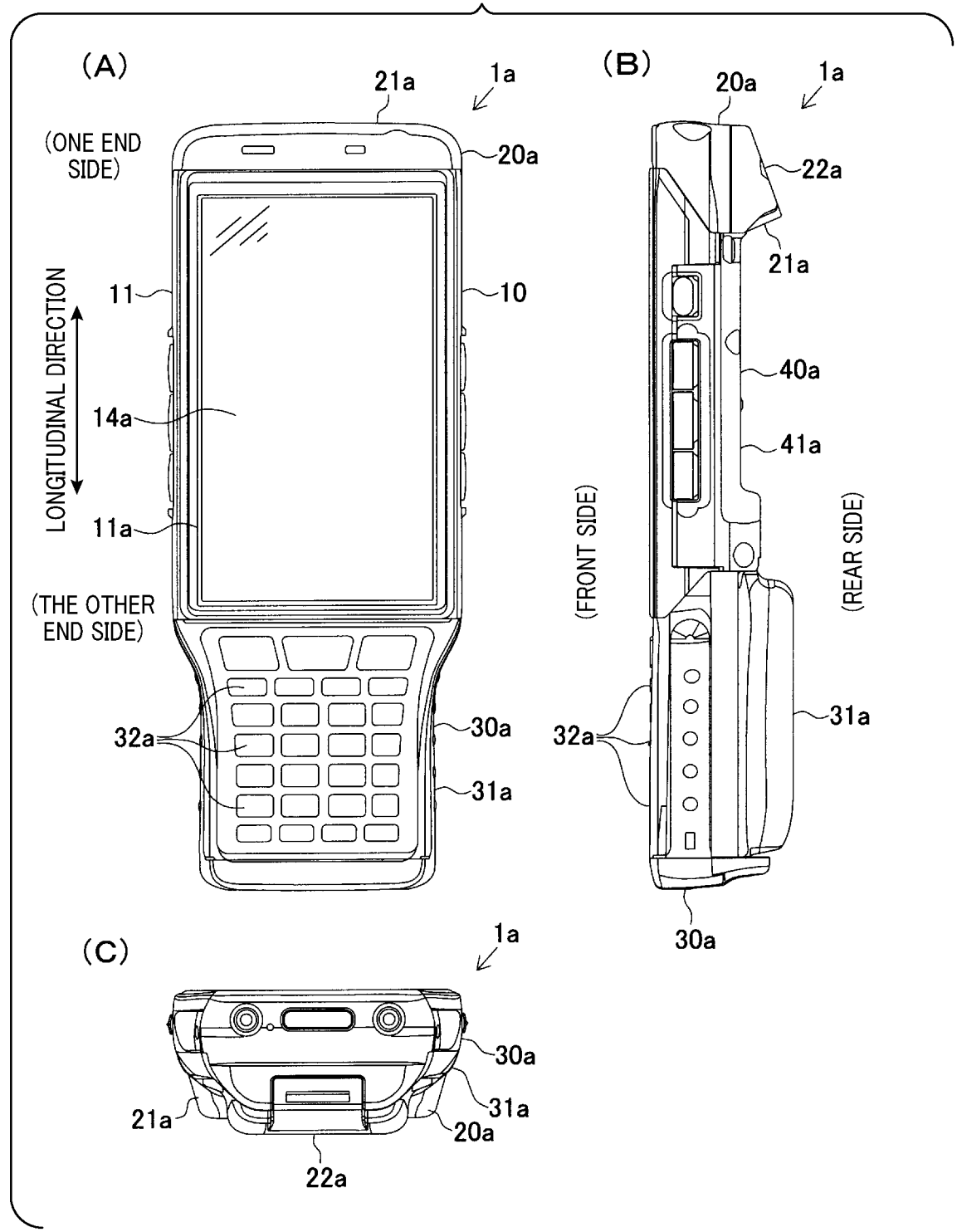
FIG. 1 illustrates an assembled state of an information reading apparatus 1*a*, in which a part (A) of FIG. 1 is a plan view, a part (B) of FIG. 1 is a side view, and a part (C) of FIG. 1 is a front view.

With reference to the drawings, an information reading apparatus according to a first embodiment of the present disclosure will be described.

An information reading apparatus according to the present embodiment is a portable information processing terminal configured to perform a predetermined function by connecting three functional modules (that is, modules assigned to the respective functions) of a top module, a bottom module, and a back (rear) module to a base module. That is, a plurality of top modules, bottom modules, and back modules are provided for each of the functions to be performed, and combinations of these functional modules can be rearranged to obtain an information reading apparatus having a desired function.

In the present embodiment, mechanically and electrically mutually separable or detachable combinations of the three functional modules connected to the base module 10 enable five information reading apparatuses 1a to 1e having different functions. Such detachable mechanisms can be realized by using known one or more mechanisms such as snap fit structures or screwing devices The information reading apparatus 1a is configured to read an information code and is provided with a keyboard. The information reading apparatus 1b differs from the information reading apparatus 1a in that it is configured to read an information code located at a farther position. The information reading apparatus 1c differs from the information reading apparatus 1a in that it is configured to read and write a wireless tag such as an RF tag, and is provided with a gun type grip. The information reading apparatus 1d differs from the information reading apparatus 1a in that it is configured as a smartphone type without having a keyboard. The information reading apparatus 1e differs from the information reading apparatus 1d in that it is configured to be chargeable in a non-contact manner.

Referring to the drawings, configurations of the information reading apparatuses 1a to 1e will be each described in detail.

Figure 2:
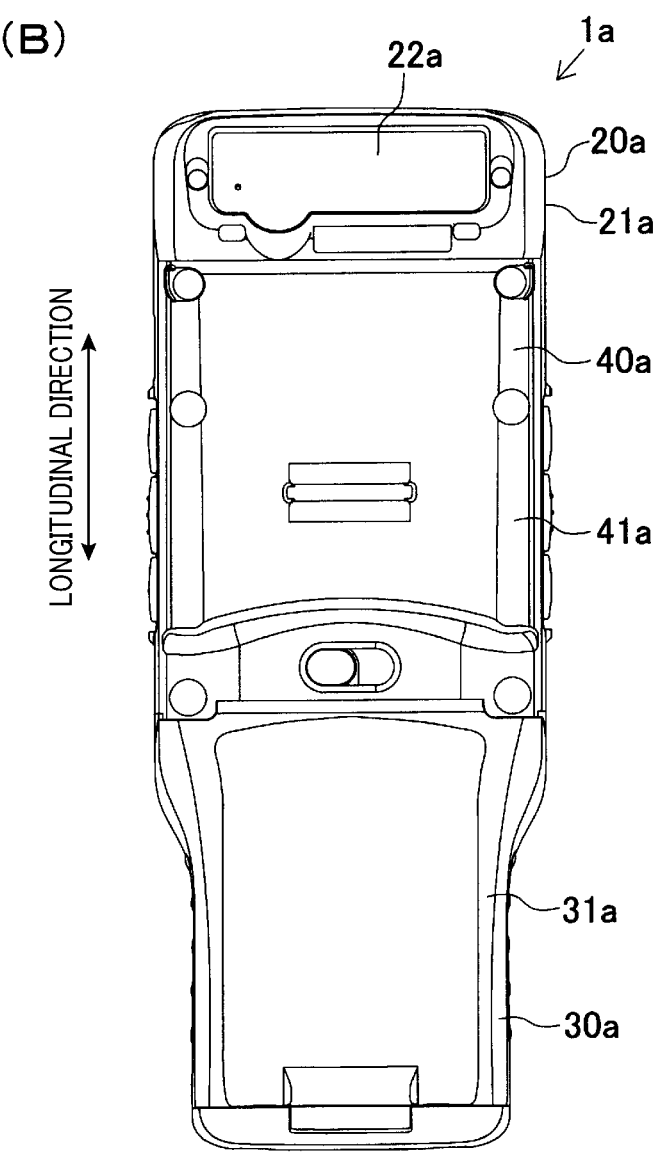
FIG. 2 illustrates an assembled state of the information reading apparatus 1*a* of FIG. 1, in which a part (A) of FIG. 2 is a rear view and a part (B) of FIG. 2 is a bottom view.
Figure 3:
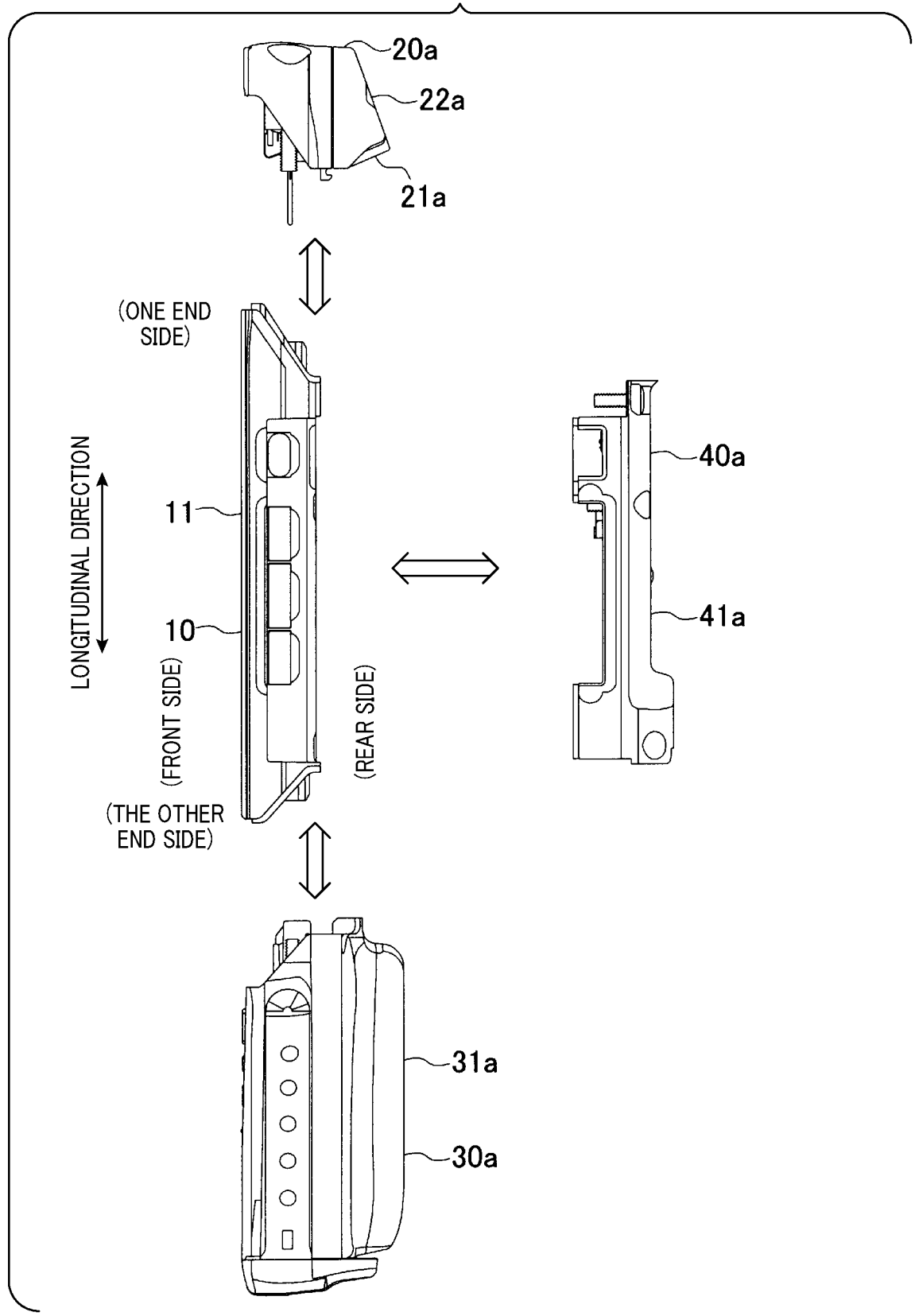
FIG. 3 is an exploded view of the information reading apparatus 1a of FIG. 1.

As shown in FIGS. 1 to 3, the information reading apparatus 1a is formed by assembling a top module 20a, a bottom module 30a, and a back module 40a to a base module 10, and electrically connecting thereto via a connector or the like.

First, the base module 10 will be described below.

The base module 10 is a module that is used common to the information reading apparatuses 1a to 1e, and has a case 11 that forms the outer casing, which houses a control unit 12 that controls the entire device including the functional modules connected thereto, a storage unit 13, a touch panel 14, and a communication unit 15. The case 11 has a connector and other members disposed on a one end-side portion (simply, one end) of the case in the longitudinal direction (by way of example, the upper side in FIG. 3), the other end-side portion (simply, the other end) of the case in the longitudinal direction (by way of example, the lower side in FIG. 3), and a rear side (by way of example, the right side in FIG. 3) for electrically and communicably connecting the control unit 12 to the functional modules assembled thereto.

The control unit 12 is provided with a computer or a computer system which has a function of performing calculation steps on software programs. In the present embodiment, the control unit 12 includes a CPU (central processing unit) 12A, a ROM (read-only memory) 12B, and a RAM (random access memory) 12C. These elements are mutually communicably connected via internal buses (not show) and also connected to an input/output interface (not shown) for commutation with various devices which are placed outside the reading device. The ROM 12B is used for previous storage of various software programs including display control applications according to the present embodiment. Hence, the ROM 12B serves as a non-transitory computer-readable recording medium. The RAM 12C is used for temporary storage of various data generated in the processing carried out by the CPU 12A.

The storage unit 13 is composed of a known storage device such as a semiconductor memory device, and a plurality of application programs for performing functions of the functional modules that can be connected to the base module 10 are pre-stored in a manner executable by the control unit 12 (more specifically, by the CPU 12A).

The touch panel 14 is configured as a known touch panel type display device, and includes a display unit configured as a known display device such as a liquid crystal display, and a transparent operation panel superimposed on a display screen 14a of the display unit and serving as a detecting section for detecting an area of the display screen 14a to which pressing (contact) operation is performed. In this touch panel 14, display content of the display unit is controlled by the control unit 12, and a large-sized display screen 14a with a thin frame (thin bezel) is disposed on a surface 11a of the case 11.

The communication unit 15 is configured as an external interface controlled by the control unit 12 to perform wireless communication or the like via a telephone line or wireless LAN by using an antenna disposed in the case 11 or an antenna disposed in the connected functional module.

Next, the top module 20a will now be described.

The top module 20a is a functional module that is assembled to a one end of the case 11 of the base module 10 in the longitudinal direction of the base module, and is configured such that an information code reading unit 23a for optically reading an information code and a sound unit 25a are housed in a case 21a that forms the outer casing.

Figure 5:
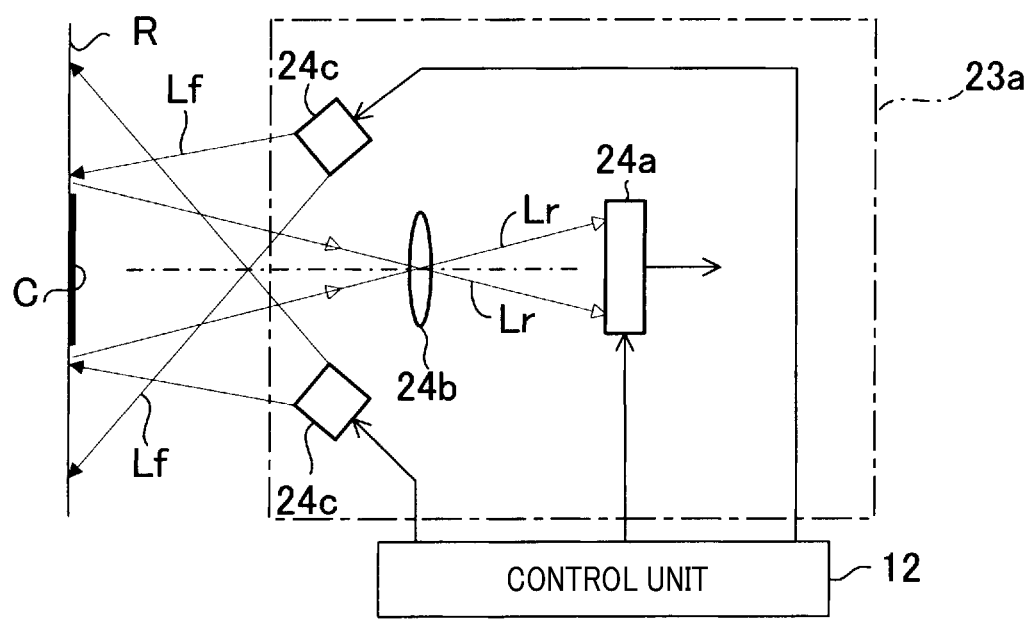
FIG. 5 is a block diagram schematically exemplifying an electric configuration of an information code reading unit of FIG. 4.

As shown in FIG. 5, the information code reading unit 23a includes a light receiving sensor 24a composed of a CCD area sensor, an imaging lens 24b, and an illumination unit 24c composed of a plurality of LEDs or lenses, and cooperates with the control unit 12 to read an information code C (bar code or two-dimensional code) attached to a reading object R. When reading is performed by the information code reading unit 23a, an illumination light Lf is first emitted from the illumination unit 24c which receives a command from the control unit 12, and the illumination light Lf is irradiated to the reading object R through a reading port 22a.

Then, a reflected light Lr, which is the illumination light Lf reflected by the information code C, is taken into the unit through the reading port 22a, and received by the light receiving sensor 24a through the imaging lens 24b. The imaging lens 24b disposed between the reading port 22a and the light receiving sensor 24a is configured to form an image of the information code C on the light receiving sensor 24a. The light receiving sensor 24a outputs a light reception signal according to the image of the information code C. The light reception signal outputted from the light receiving sensor 24a is stored in the storage unit 13 as image data, and is used for decoding process for acquiring the information recoded in the information code C.

Although not shown in the figure, the information code reading unit 23a is provided with an amplification circuit for amplifying a signal from the light receiving sensor 24a, and an AD conversion circuit for converting the amplified signal into a digital signal. Further, the information code reading unit 23a may correspond to an example of a "first reading unit" which reads the information code C as external information.

The sound unit 25a includes a known speaker or another sounding device, and is controlled by the control unit 12 to function to generate sound, a predetermined beep sound, and/or alarm sound. Further, in addition to the sound generation function such as a speaker, the sound unit may also be provided with a sound collection function such as a microphone and an earphone jack.

Next, the bottom module 30a will now be described.

The bottom module 30a is a functional module that is assembled to the other end of the case 11 of the base module 10 in the longitudinal direction of the base module, and is configured such that a key operation unit 32a and a battery unit 33a are housed in a case 31a that forms the outer casing. Further, at the lower end of the case 31a, a connector for external connection, a charging terminal for the battery unit 33a, and other members are arranged and exposed.

The key operation unit 32a includes a plurality of function keys, ten keys, and other devices, and is configured to output an operation signal corresponding to the key operation to the control unit 12.

Next, the back module 40a will now be described.

The back module 40a is a functional module that is assembled to the rear side of the display screen 14a in the base module 10, and is configured such that an antenna 42a that can be used by the communication unit 15 is disposed inside of a case 41a that forms the outer casing.

Figure 4:
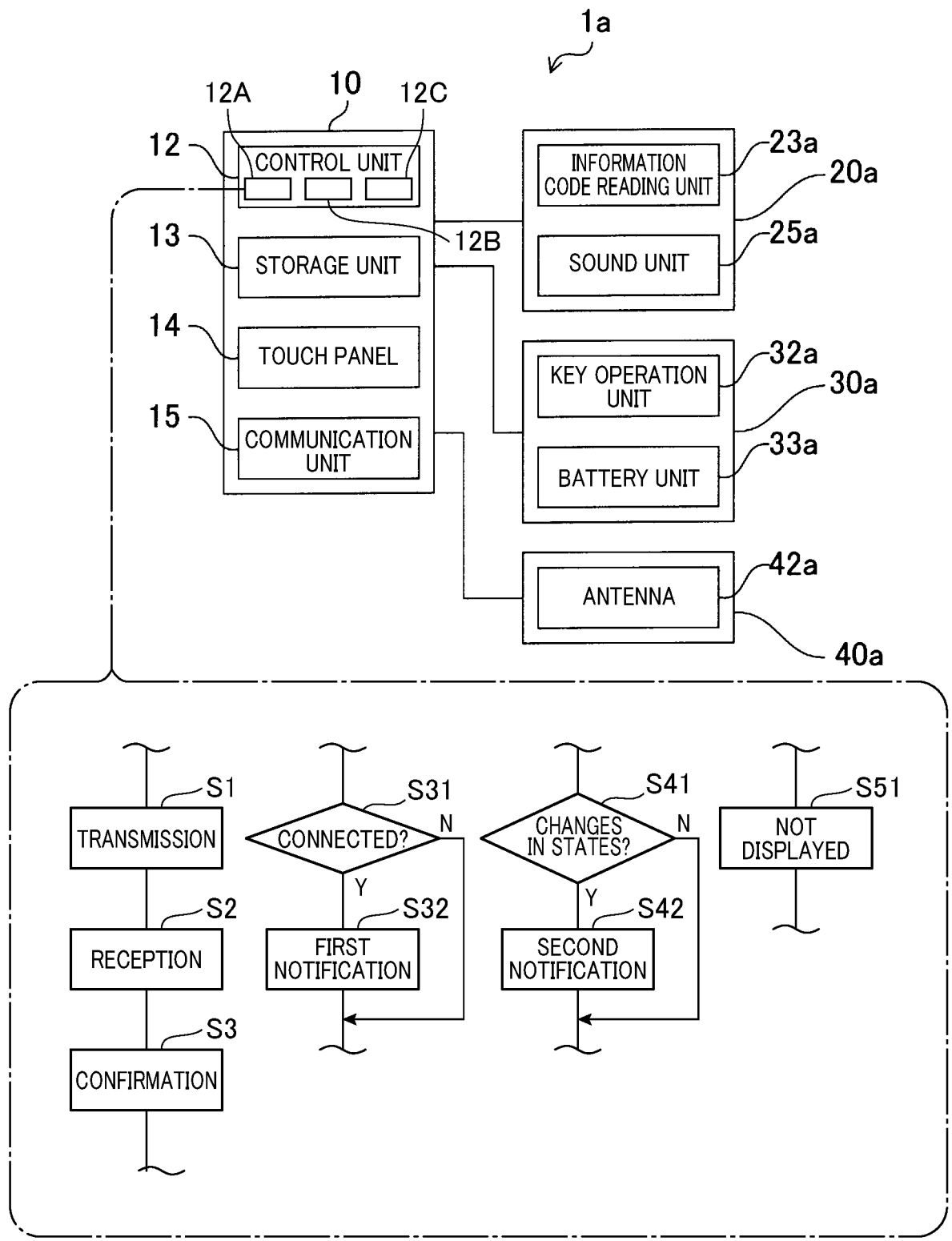
FIG. 4 is a block diagram (including a part of the processes executed by a control unit) schematically showing an electric configuration of the information reading apparatus 1a of FIG. 1.

Thus, as shown in FIGS. 1 to 3, the top module 20a, the bottom module 30a, and the back module 40a configured as described above are detachably or separably assembled to the one end in the longitudinal direction, the other end in the longitudinal direction, and the rear side of the base module 10 to form the information reading apparatus 1a. In assembly of these components, as shown in FIG. 4, the information code reading unit 23a and the sound unit 25a of the top module 20a, the key operation unit 32a of the bottom module 30a, the antenna 42a of the back module 40a, and a further member are connected to the unit 12 via a connector or the like. Further, the battery unit 33a of the bottom module 30a is connected to the control unit 12 and various electric components of the respective modules so as to be able to supply power.

In the information reading apparatus 1a configured as described above, when the power is applied, the control unit 12 transmits a predetermined electrical signal to each of the three functional modules connected to the base module 10 (refer to step S1 in FIG. 4) for connection confirmation. In response to this transmission, the control unit 12 receives or acquires from the respective functional modules confirmation signals (electrical signals) (step S2 in FIG. 4), and, using the conformation signals and for example by making reference to tables in the memory, recognizes connection of the respective functional modules connected to the base module 10 (step S3 in FIG. 4), so that the control unit 12 is able to recognize one or more functions or states imparted the connected functional module 12.

When the top module 20a, the bottom module 30a, and the back module 40a are connected as described above, the control unit 12 recognizes the imparted function or the like on the basis of a signal from the information code reading unit 23a and the sound unit 25a of the top module 20a, the key operation unit 32a and the battery unit 33a of the bottom module 30a, and the antenna 42a of the back module 40a.

Then, an application program for implementing the recognized function is displayed on the display screen 14a in a user's selectable manner. According to the above connection configuration, for example, an application program for reading an information code and an application program for using the sound unit 25a are displayed on the display screen 14a in a selectable manner. In the above connection configuration, for example, imparting of a function for reading an RF tag as described later is not recognized. Accordingly, an application program for reading an RF tag is not displayed in a selectable manner on the display screen 14a.

On the other hand, for example, when the power is applied while the top module 20a is not connected, the control unit 12 cannot receive an electrical signal from the top module 20a (step S31 in FIG. 4). Accordingly, it is displayed on the display screen 14a of the touch panel 14 as a first notification to notify that the top module is in a connection failure state (step S32 in FIG. 4). The touch panel 14 may correspond to an example of a "notification unit" whose notification content is controlled by the control unit 12.

Next, a configuration of the information reading apparatus 1b will be described below.

The information reading apparatus 1b is a device configured to be able to read an information code located at a more distant position, and differs from the information reading apparatus 1a in that, as shown in FIGS. 6 to 9, it includes a top module 20b instead of the top module 20a. That is, the information reading apparatus 1b is formed by assembling the top module 20b, the bottom module 30a, and the back module 40a to the base module 10, and electrically connecting thereto via a connector or the like.

The top module 20b is configured such that an information code reading unit 23b for optically reading an information code via a reading port 22b and the sound unit 25a are housed in a case 21b that forms the outer casing. The information code reading unit 23b is large-sized to capture an information code located farther from the information code reading unit 23a in a decodable manner. Unlike the case 21a, the case 21b that holds the information code reading unit 23b is formed to have a height protruding from the back module 40a. Further, the information code reading unit 23b may correspond to an example of a "first reading unit" which reads the information code C as external information.

Figure 6:
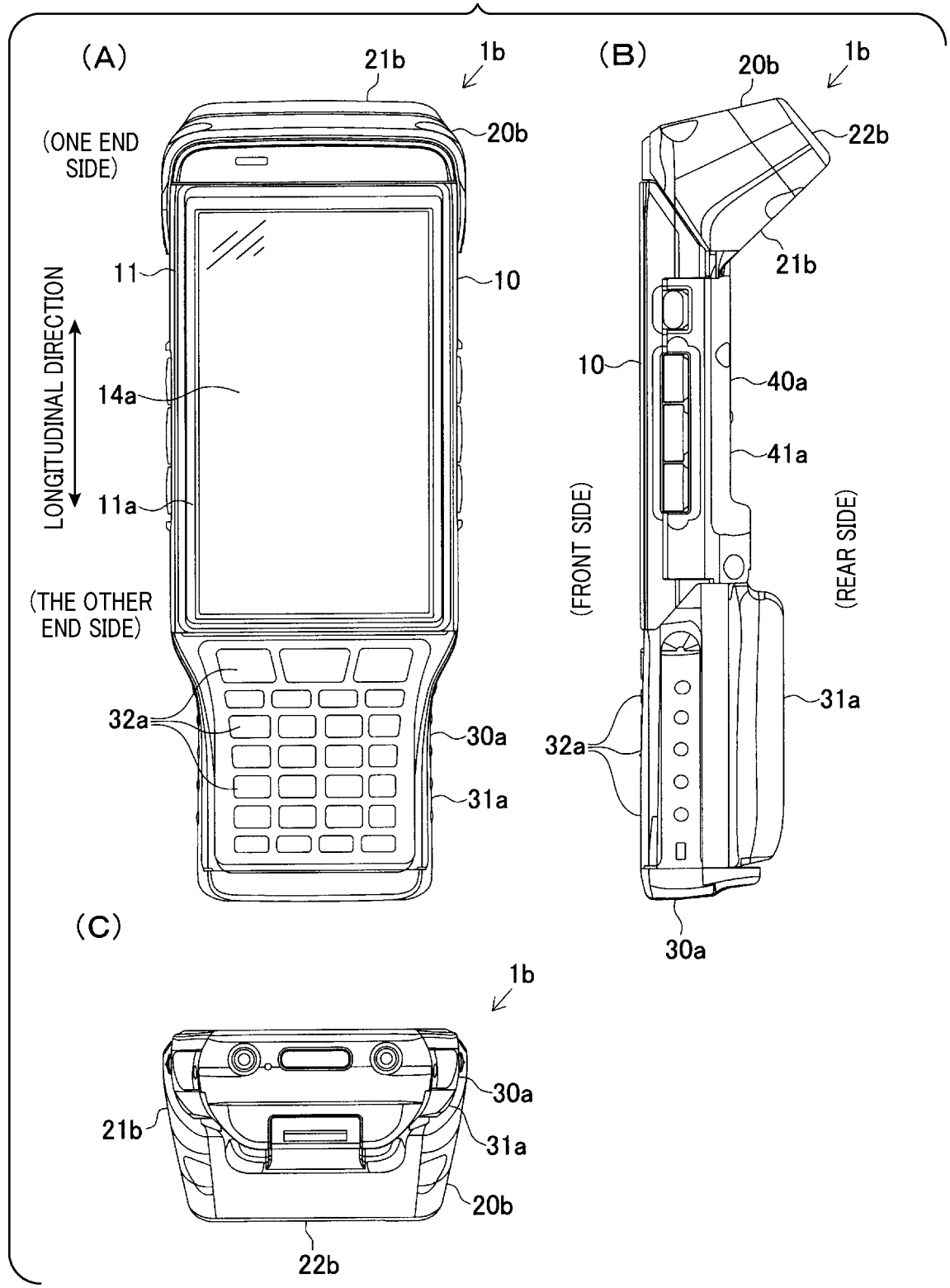
Figure 7:
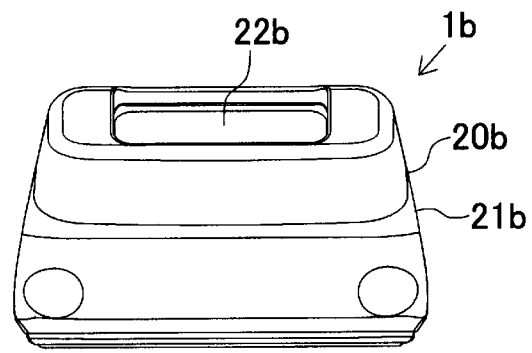
FIG. 7 illustrates an assembled state of the information reading apparatus 1b of FIG. 6, in which a part (A) of FIG. 7 is a rear view and a part (B) of FIG. 7 is a bottom view, which illustrate an assembled state of the information reading apparatus 1b of FIG. 6.
Figure 7:
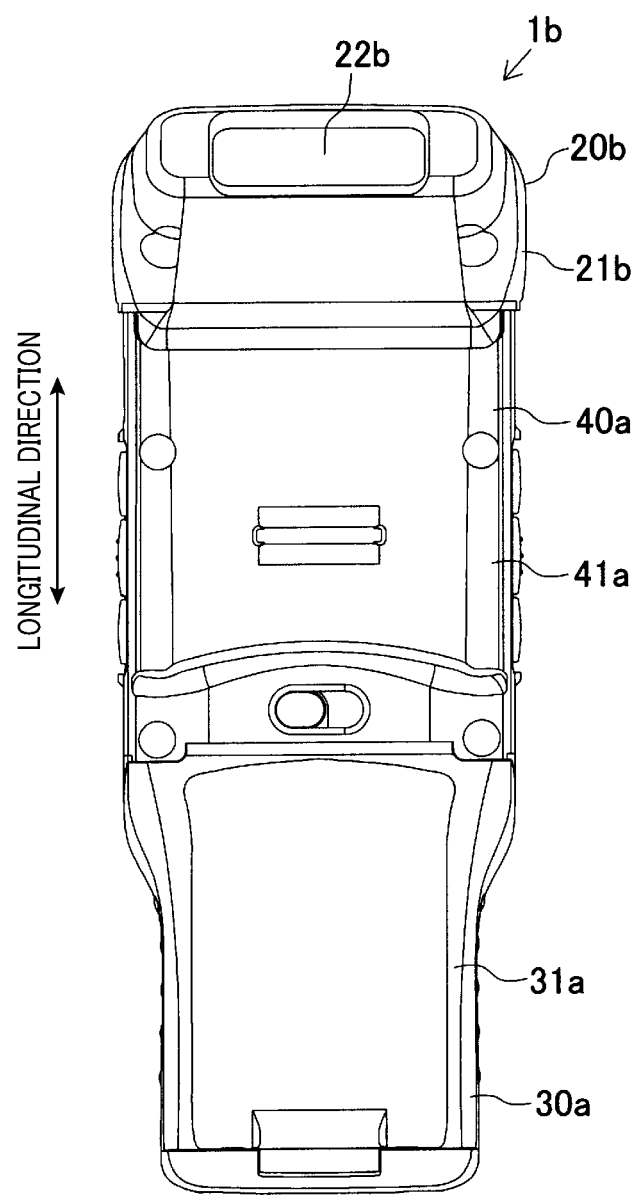
Figure 8:
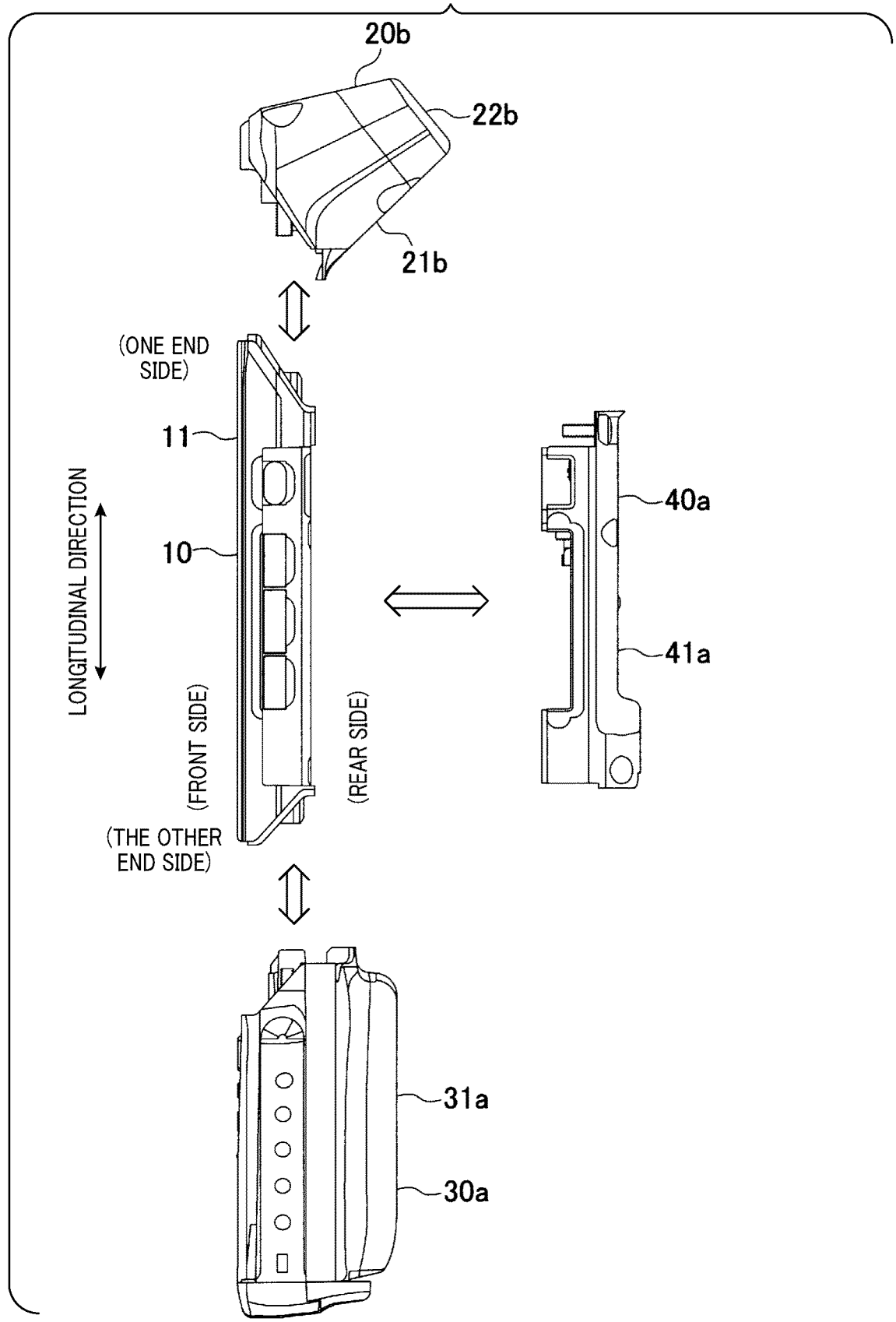
FIG. 8 is an exploded view of the information reading apparatus 1b of FIG. 6.
Figure 9:
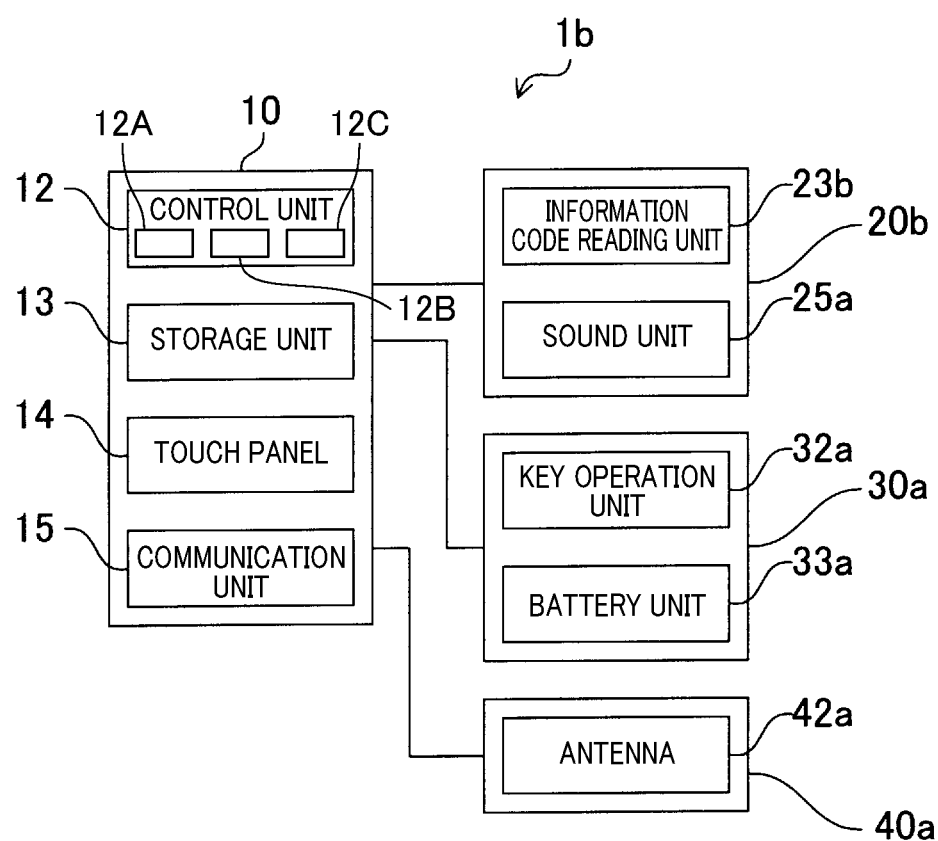
FIG. 9 is a block diagram schematically exemplifying an electric configuration of the information reading apparatus 1b of FIG. 6.

Thus, as shown in FIGS. 6 to 8, the top module 20b, the bottom module 30a, and the back module 40a configured as described above are detachably assembled to the one end in the longitudinal direction, the other end in the longitudinal direction, and the rear side of the base module 10 to form the information reading apparatus 1b. In assembly of these components, as shown in FIG. 9, the information code reading unit 23b and the sound unit 25a of the top module 20b, the key operation unit 32a of the bottom module 30a, the antenna 42a of the back module 40a, and other members are connected to the unit 12 via a connector or the like.

Further, the battery unit 33a of the bottom module 30a is connected to the control unit 12 and various electric components of the respective modules so as to be able to supply power.

In the information reading apparatus 1b configured as described above, when the power is applied, the control unit 12 recognizes the imparted function or the like on the basis of a signal from the information code reading unit 23b and the sound unit 25a of the top module 20b, the key operation unit 32a and the battery unit 33a of the bottom module 30a, and the antenna 42a of the back module 40a in the same manner as the information reading apparatus 1a. Then, an application program for implementing the recognized function is displayed on the display screen 14a in a selectable manner. Further, when any of the functional modules is not connected, it is displayed on the display screen 14a as a first notification to notify that the module is in a connection failure state.

Next, a configuration of the information reading apparatus 1c will be described below.

The information reading apparatus 1c is a device that is able to read and write an RF tag and provided with a gun type grip, and differs from the information reading apparatus 1a in that, as shown in FIGS. 10 to 13, it includes a top module 20c and an back module 40c instead of the top module 20a and the back module 40a, respectively. That is, the information reading apparatus 1c is formed by assembling the top module 20c, the bottom module 30a, and the back module 40c to the base module 10, and electrically connecting thereto via a connector or the like.

Figure 14:
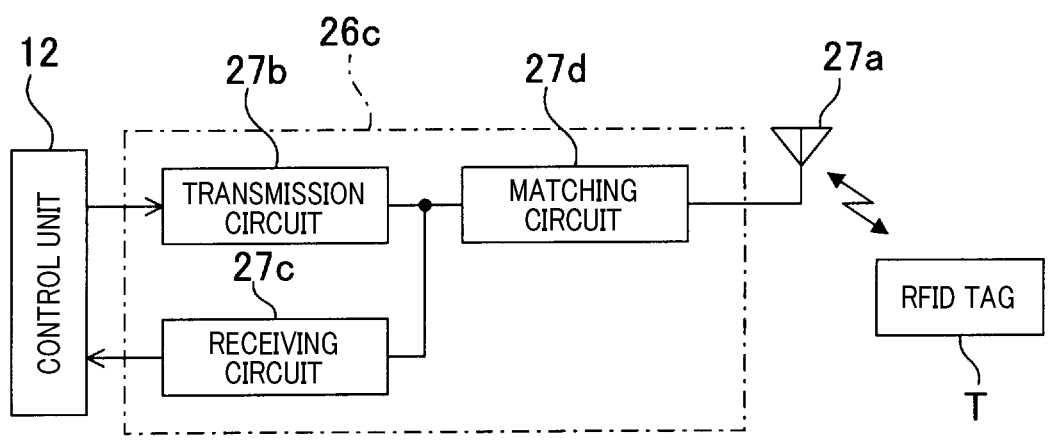
FIG. 14 is a block diagram schematically exemplifying an electric configuration of an RF tag processing unit of FIG. 13.

The top module 20c is configured such that an RF tag processing unit 26c and the sound unit 25a are housed in a case 21c that forms the outer casing. The RF tag processing unit 26c coordinates with an RF tag antenna 27a and the control unit 12 to communicate with the RF tag T via electromagnetic waves to perform reading of data stored in the RF tag T or writing of data to the RF tag T. The RF tag processing unit 26c is configured as a circuit that performs transmission by a known radio wave method, and, as schematically shown in FIG. 14, includes a transmission circuit 27b, a receiving circuit 27c, a matching circuit 27d, and other circuits.

The transmission circuit 27b includes a carrier oscillator, an encoding unit, an amplifier, a transmitter filter, a modulating unit, and other units, and is configured to output a carrier (carrier wave) of a predetermined frequency from the carrier oscillator. Further, the encoding unit is connected to the control unit 12, and encodes transmission data outputted from the control unit 12 to output the encoded transmission data to the modulating unit. The modulating unit receives the carrier (carrier wave) from the carrier oscillator and the transmission data from the encoding unit, and generates a modulated signal by amplitude shift keying (ASK) modulation to the carrier (carrier wave) outputted from the carrier oscillator by an encoded transmission code (modulated signal) outputted from the encoding unit at the time of command transmission to a communication target, and outputs the modulated signal to the amplifier. The amplifier amplifies the inputted signal (modulated signal that is modulated by the modulating unit) with a predetermined gain, and outputs the amplified signal to the transmitter filter. The transmitter filter filters the amplified signal from the amplifier into a transmission signal, and outputs the transmission signal to the antenna 27a via the matching circuit 27d. Then, when the transmission signal is outputted to the antenna 27a, the transmission signal is radiated as a transmission radio wave from the antenna 27a to the outside.

Further, a response signal received by the antenna 27a is inputted to the receiving circuit 27c via the matching circuit 27d. The receiving circuit 27c includes a transmitter filter, an amplifier, a demodulation unit, a binarizing processing unit, decoding unit, and other units. After filtering of the response signal received via the antenna 27a by the transmitter filter, the filtered signal is amplified by the amplifier, and the amplified signal is demodulated by the demodulation unit. Then, the demodulated signal waveform is binarized by the binarizing processing unit, and, after decoding by the decoding unit, the decoded signal is outputted to the control unit 12 as a received data. Further, the RF tag processing unit 26c may correspond to an example of a "first reading unit" that reads the information recoded in the RF tag T as external information and a "wireless communication unit."

The back module 40c is a functional module that is assembled to the rear side of the display screen 14a in the base module 10, and is configured such that part of the case 41c that forms the outer casing forms a grip 43c of a gun type. A trigger key 44c is disposed on an outer surface of the case 41c adjacent to the top module 20c, and a large capacity battery unit 45c is housed in the case 41c.

Figure 10:
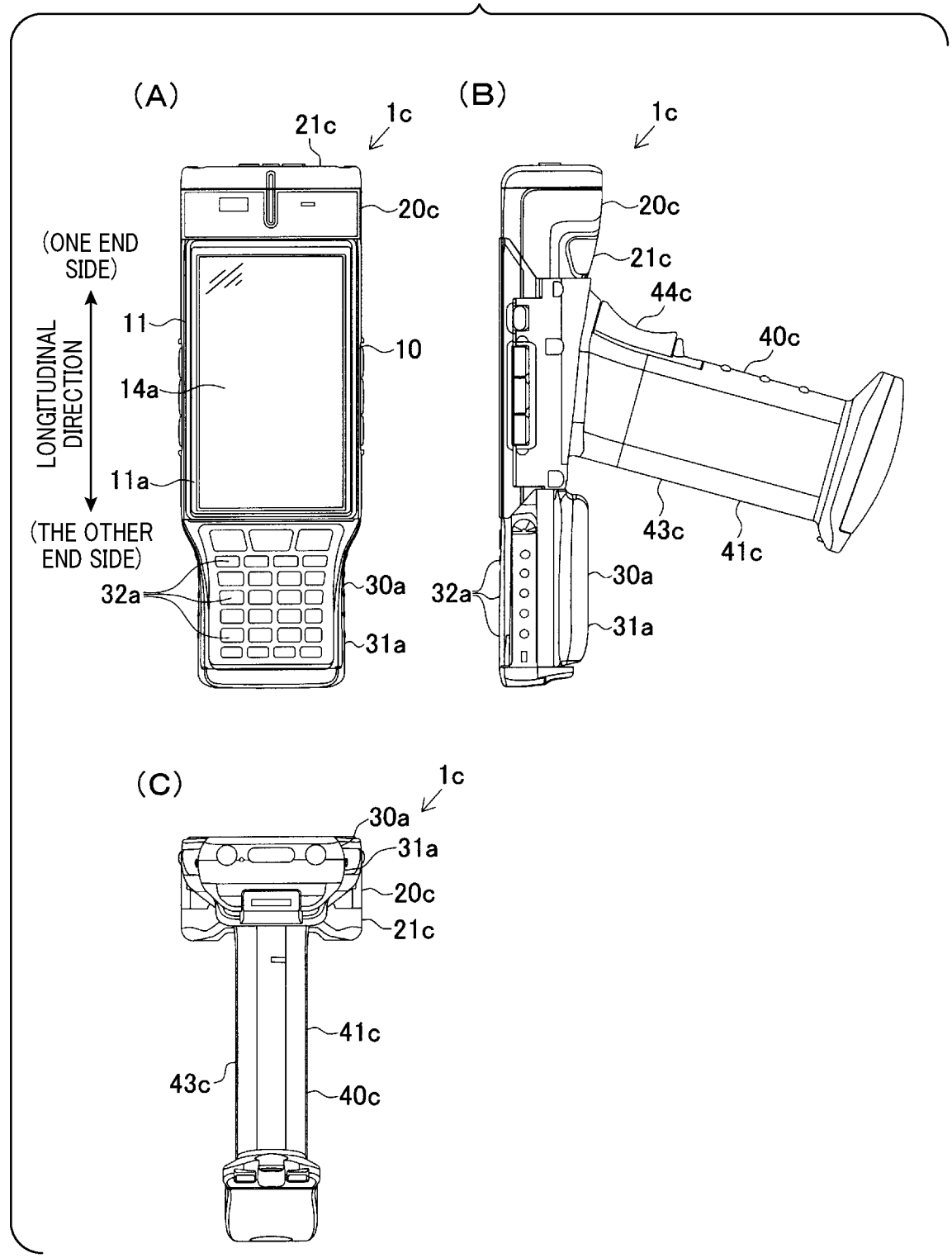
FIG. 10 illustrates an assembled state of an information reading apparatus 1c, in which a part (A) of FIG. 10 is a plan view, a part (B) of FIG. 10 is a side view, and a part (C) of FIG. 10 is a front view.
Figure 11:
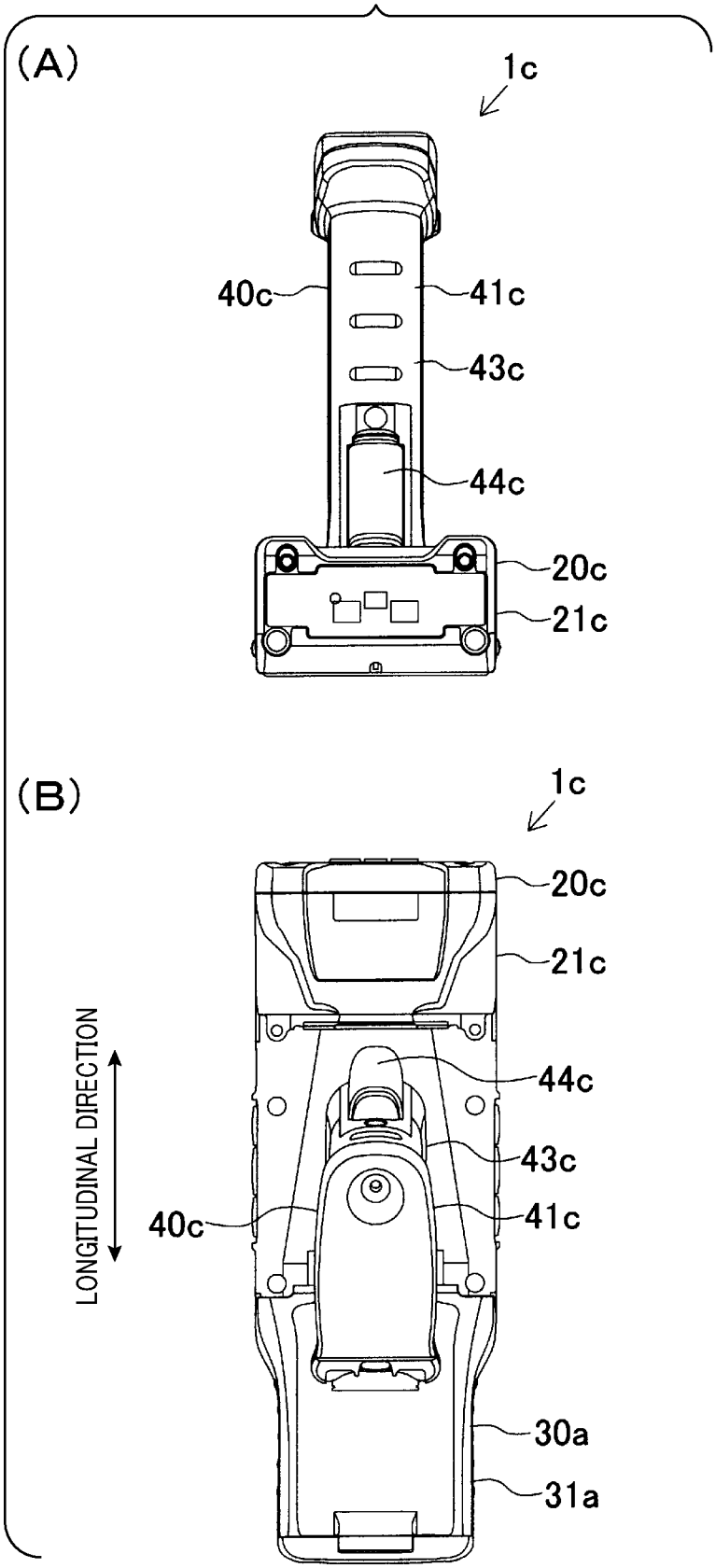
FIG. 11 illustrates an assembled state of the information reading apparatus 1c of FIG. 10, in which a part (A) of FIG. 11 is a rear view and a part (B) of FIG. 11 is a bottom view.
Figure 12:
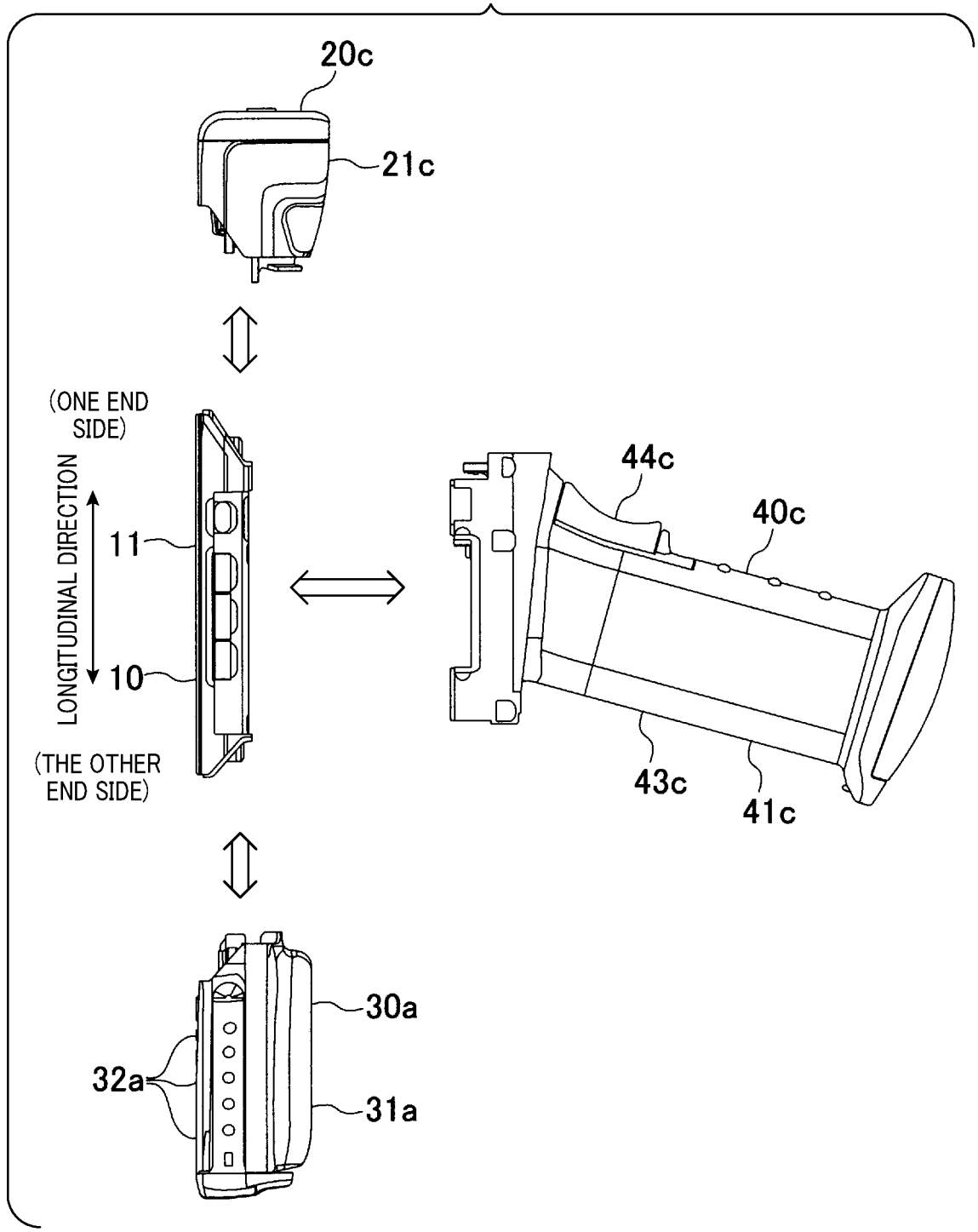
FIG. 12 is an exploded view of the information reading apparatus 1c of FIG. 10.
Figure 13:
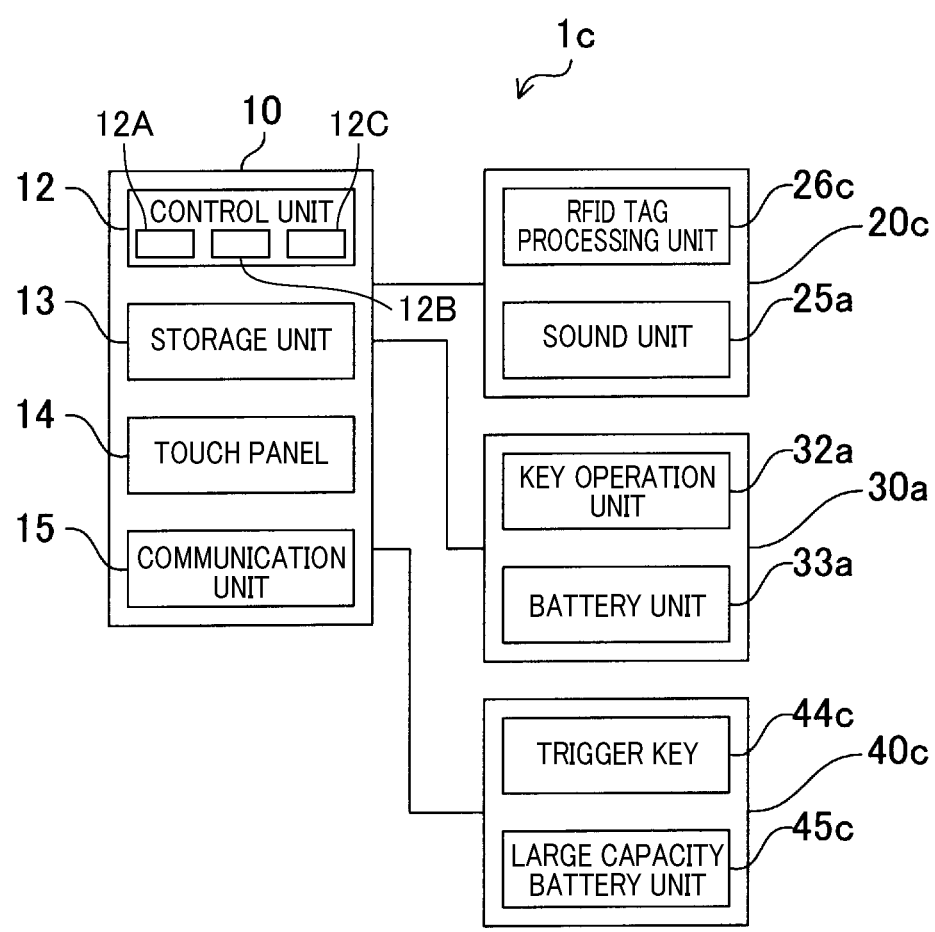
FIG. 13 is a block diagram schematically exemplifying an electric configuration of the information reading apparatus 1c of FIG. 10.

Thus, as shown in FIGS. 10 to 12, the top module 20c, the bottom module 30a, and the back module 40c configured as described above are detachably assembled to the one end in the longitudinal direction, the other end in the longitudinal direction, and the rear side of the base module 10 to form the information reading apparatus 1c. In assembly of these components, as shown in FIG. 13, the RF tag processing unit 26c and the sound unit 25a of the top module 20c, the key operation unit 32a of the bottom module 30a, the trigger key 44c of the back module 40c, and other members are connected to the unit 12 via a connector or the like. Further, the battery unit 33a of the bottom module 30a and a large capacity battery unit 45c of the back module 40c are connected to the control unit 12 and various electric components of the respective modules so as to be able to supply power.

In the information reading apparatus 1c configured as described above, when the power is applied, the control unit 12 recognizes the imparted function or the like on the basis of a signal from the RF tag processing unit 26c and the sound unit 25a of the top module 20c, the key operation unit 32a and the battery unit 33a of the bottom module 30a, and the trigger key 44c and the large capacity battery unit 45c of the back module 40c in the same manner as the information reading apparatus 1a.

Then, an application program for implementing the recognized function is displayed on the display screen 14a in a selectable manner. According to the above connection configuration, for example, an application program for reading an RF tag and an application program for using the sound unit 25a are displayed on the display screen 14a in a selectable manner, and imparting of a function for optically reading an information code is not recognized. Accordingly, an application program for reading an information code is not displayed in a selectable manner on the display screen 14a. Further, when any of the functional modules is not connected, it is displayed on the display screen 14a as a first notification to notify that the module is in a connection failure state.

The RF tag processing unit 26c of the information reading apparatus 1c according to the present embodiment sequentially transmits pieces of information read from a plurality of RF tags T to the control unit 12 without receiving an instruction from the control unit 12, except for an initial confirmation instruction from the control unit 12 for recognizing the function when the power is applied. Accordingly, the control unit 12 can sequentially receive pieces of information read from the RF tag processing unit 26c without performing reading instruction to the RF tag processing unit 26c.

Next, a configuration of the information reading apparatus 1d will be described below.

The information reading apparatus 1d is a device configured as a smartphone type without a keyboard to achieve reduction in size and weight, and differs from the information reading apparatus 1a in that, as shown in FIGS. 15 to 18, it includes a bottom module 30d instead of the bottom module 30a. That is, the information reading apparatus 1d is formed by assembling the top module 20a, the bottom module 30d, and the back module 40a to the base module 10, and electrically connecting thereto via a connector or the like.

The bottom module 30d is configured such that the battery unit 33d is housed in the case 31d that forms the outer casing together with the case 11 of the base module 10. Further, at the lower end of the case 31d, a connector for external connection, a charging terminal for the battery unit 33d, and other units are arranged and exposed.

Figure 15:
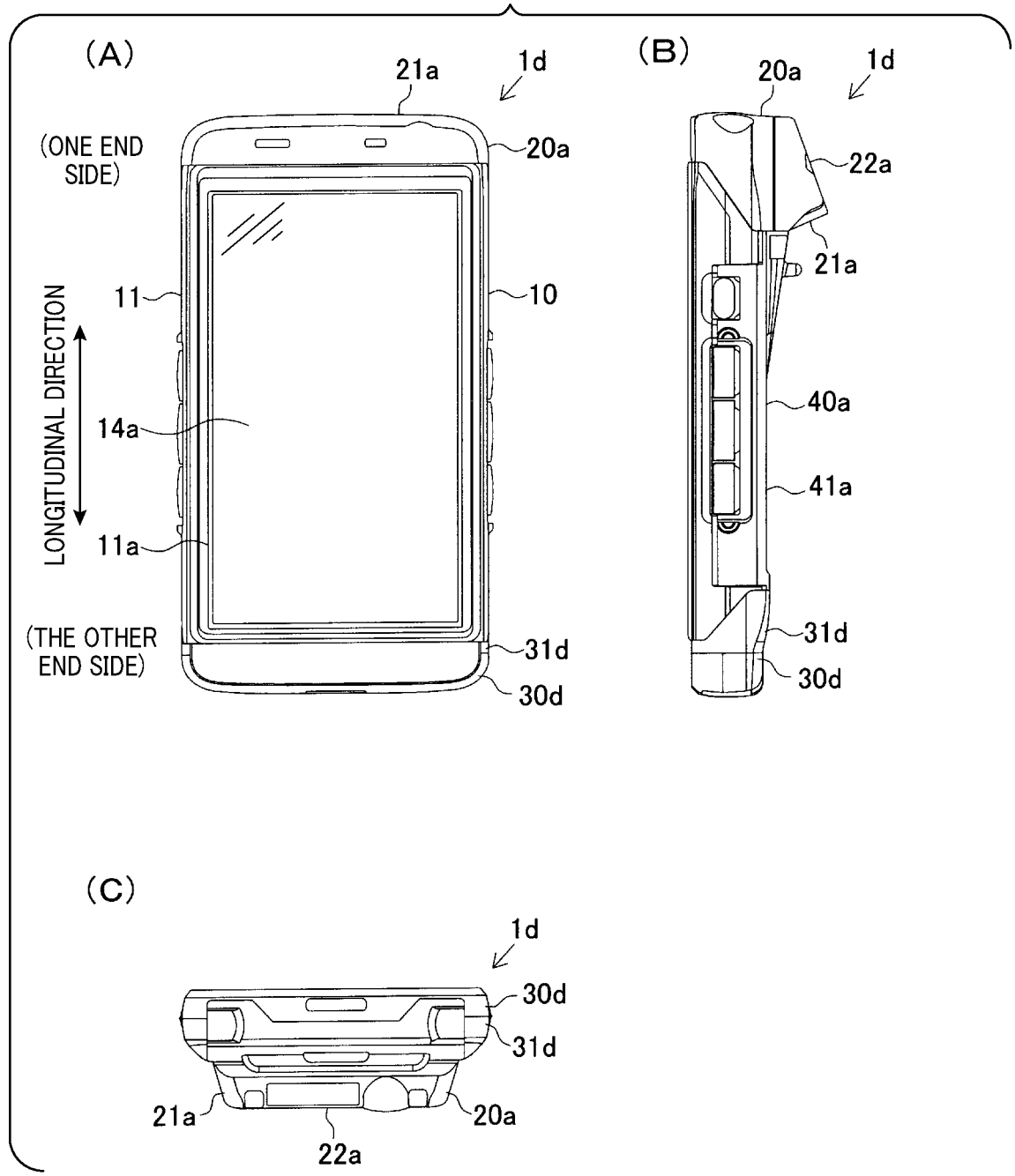
FIG. 15 illustrates an assembled state of an information reading apparatus 1d, in which a part (A) of FIG. 15 is a plan view, a part (B) of FIG. 15 is a side view, and a part (C) of FIG. 15 is a front view.
Figure 16:
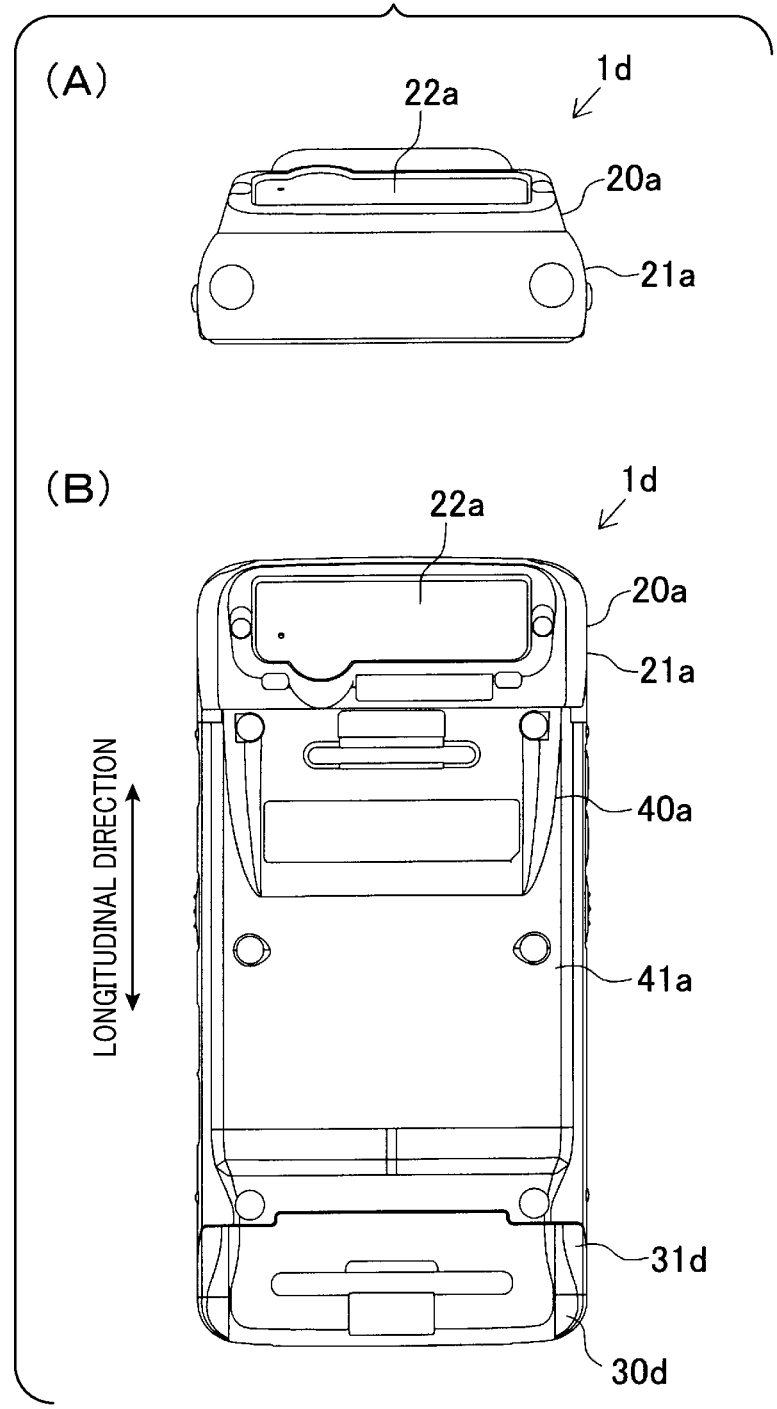
FIG. 16 illustrates an assembled state of the information reading apparatus 1d of FIG. 15, in which a part (A) of FIG. 16 is a rear view and a part (B) of FIG. 16 is a bottom view.
Figure 17:
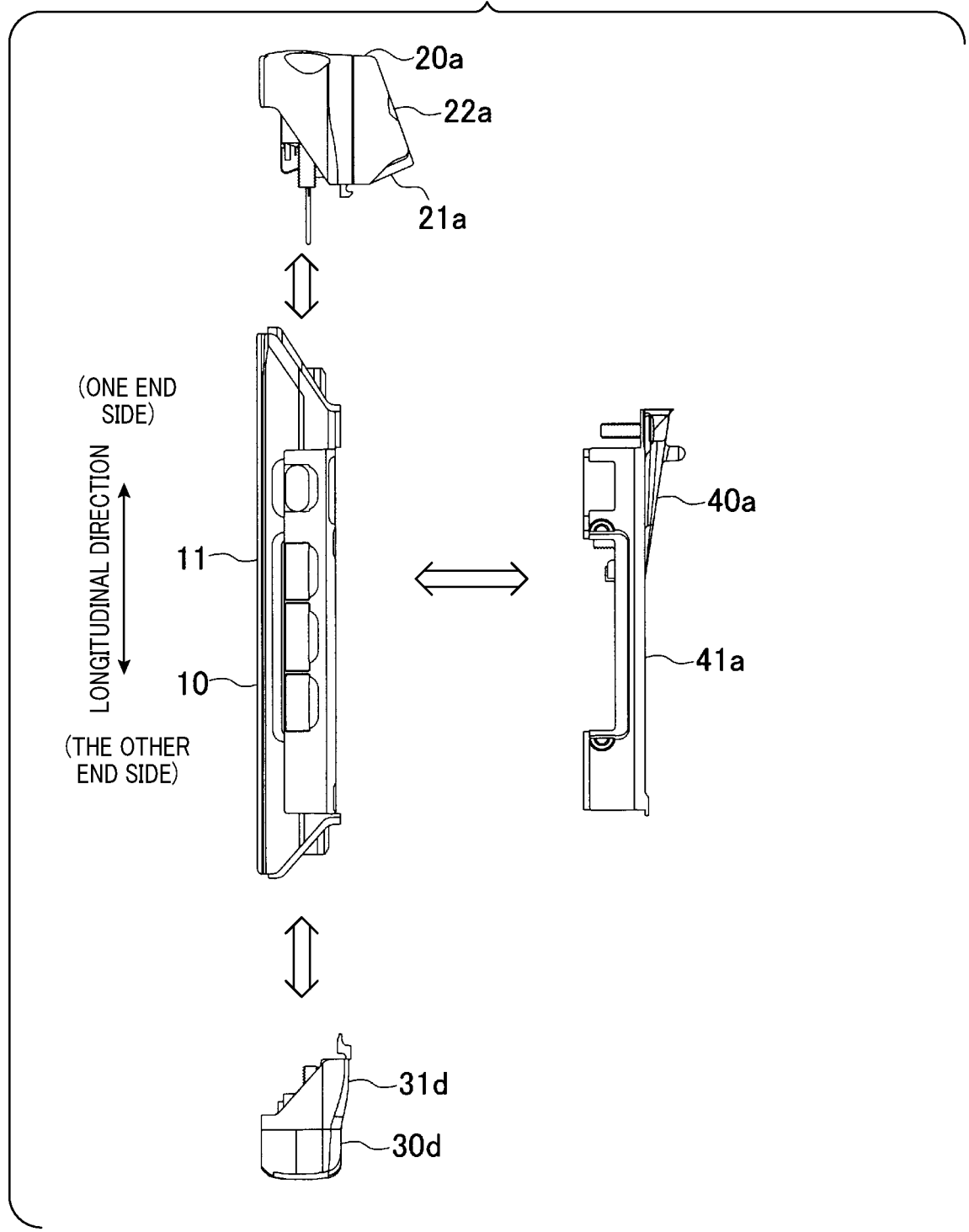
FIG. 17 is an exploded view of the information reading apparatus 1d of FIG. 15.
Figure 18:
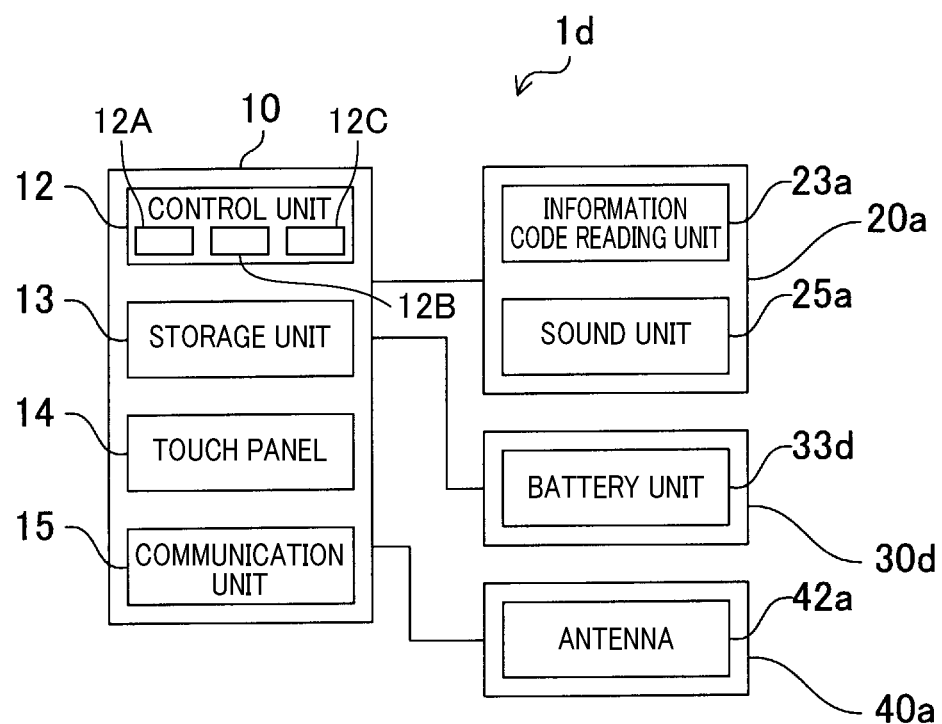
FIG. 18 is a block diagram schematically exemplifying an electric configuration of the information reading apparatus 1d of FIG. 15.

Thus, as shown in FIGS. 15 to 17, the top module 20a, the bottom module 30d, and the back module 40a configured as described above are detachably assembled to the one end in the longitudinal direction, the other end in the longitudinal direction, and the rear side of the base module 10 to form the information reading apparatus 1d. In assembly of these components, as shown in FIG. 18, the information code reading unit 23a and the sound unit 25a of the top module 20a, the antenna 42a of the back module 40a, and other members are connected to the unit 12 via a connector or the like. Further, the battery unit 33d of the bottom module 30d is connected to the control unit 12 and various electric components of the respective modules so as to be able to supply power.

In the information reading apparatus 1d configured as described above, when the power is applied, the control unit 12 recognizes the imparted function or the like on the basis of a signal from the information code reading unit 23a and the sound unit 25a of the top module 20a, the battery unit 33d of the bottom module 30d, and the antenna 42a of the back module 40a in the same manner as the information reading apparatus 1a.

Then, an application program for implementing the recognized function is displayed on the display screen 14a in a selectable manner. According to the above connection configuration, for example, an application program for reading an information code and an application program for using the sound unit 25a are displayed on the display screen 14a in a selectable manner, while an application program for reading and writing an RF tag is not displayed in a selectable manner on the display screen 14a. Further, when any of the functional modules is not connected, it is displayed on the display screen 14a as a first notification to notify that the module is in a connection failure state.

Next, a configuration of the information reading apparatus 1d will be described below.

The information reading apparatus 1e is a device configured as a smartphone type that is chargeable in a non-contact manner, and differs from the information reading apparatus 1d in that, as shown in FIGS. 19 to 22, it includes a back module 40e instead of the back module 40a. That is, the information reading apparatus 1e is formed by assembling the top module 20a, the bottom module 30d, and the back module 40e to the base module 10, and electrically connecting thereto via a connector or the like.

The back module 40e is a functional module that is assembled to the rear side of the display screen 14a in the base module 10 as with the back module 40a. A case 41e that forms the outer casing of the back module 40e differs from the case 41a in that it includes a recess protruding outward and formed at the center on the inner surface such that the non-contact charging unit 46e is disposed in the recess.

Figure 19:
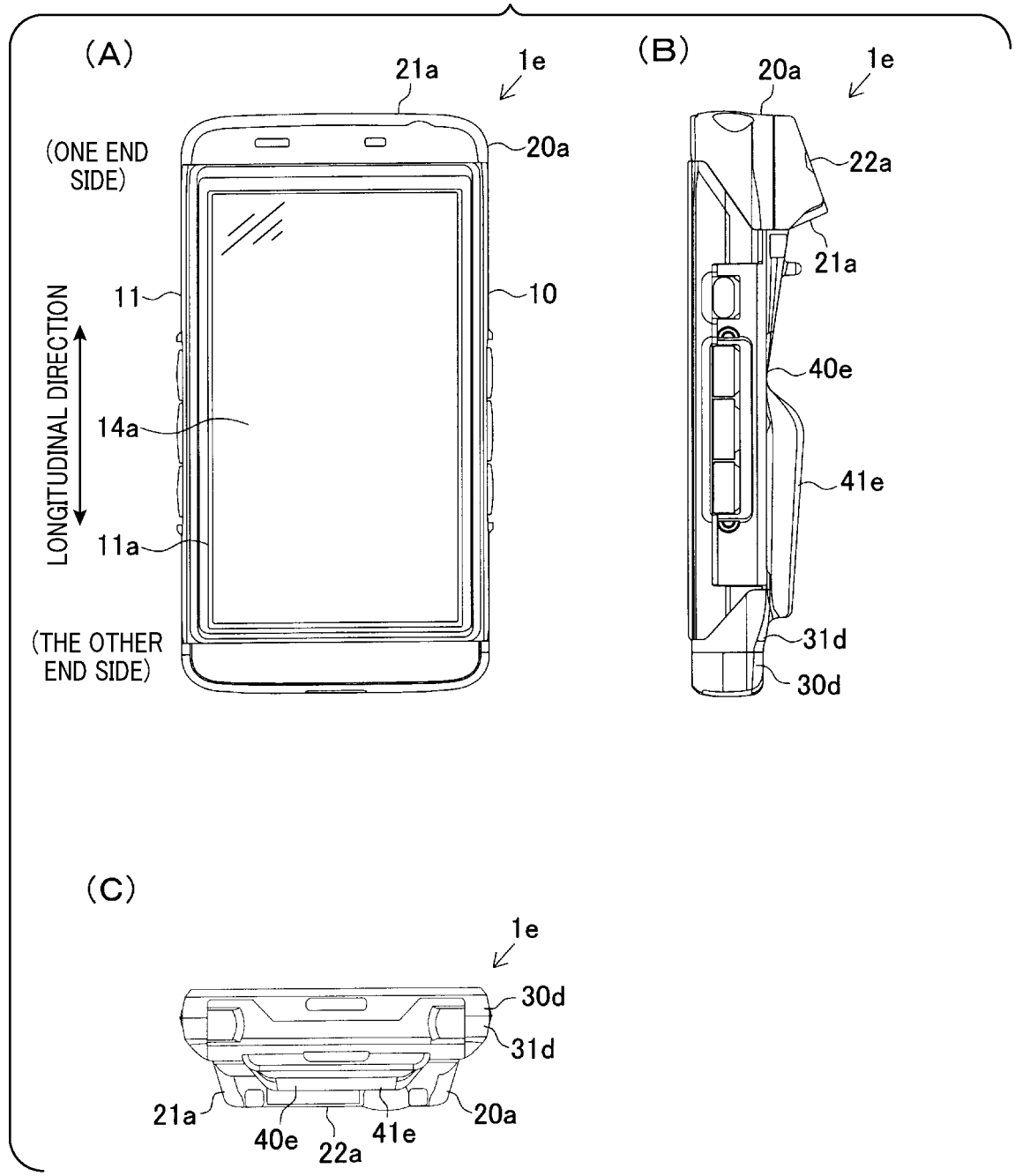
FIG. 19 illustrates an assembled state of an information reading apparatus 1e, in which a part (A) of FIG. 19 is a plan view, a part (B) of FIG. 19 is a side view, and a part (C) of FIG. 19 is a front view.
Figure 20:
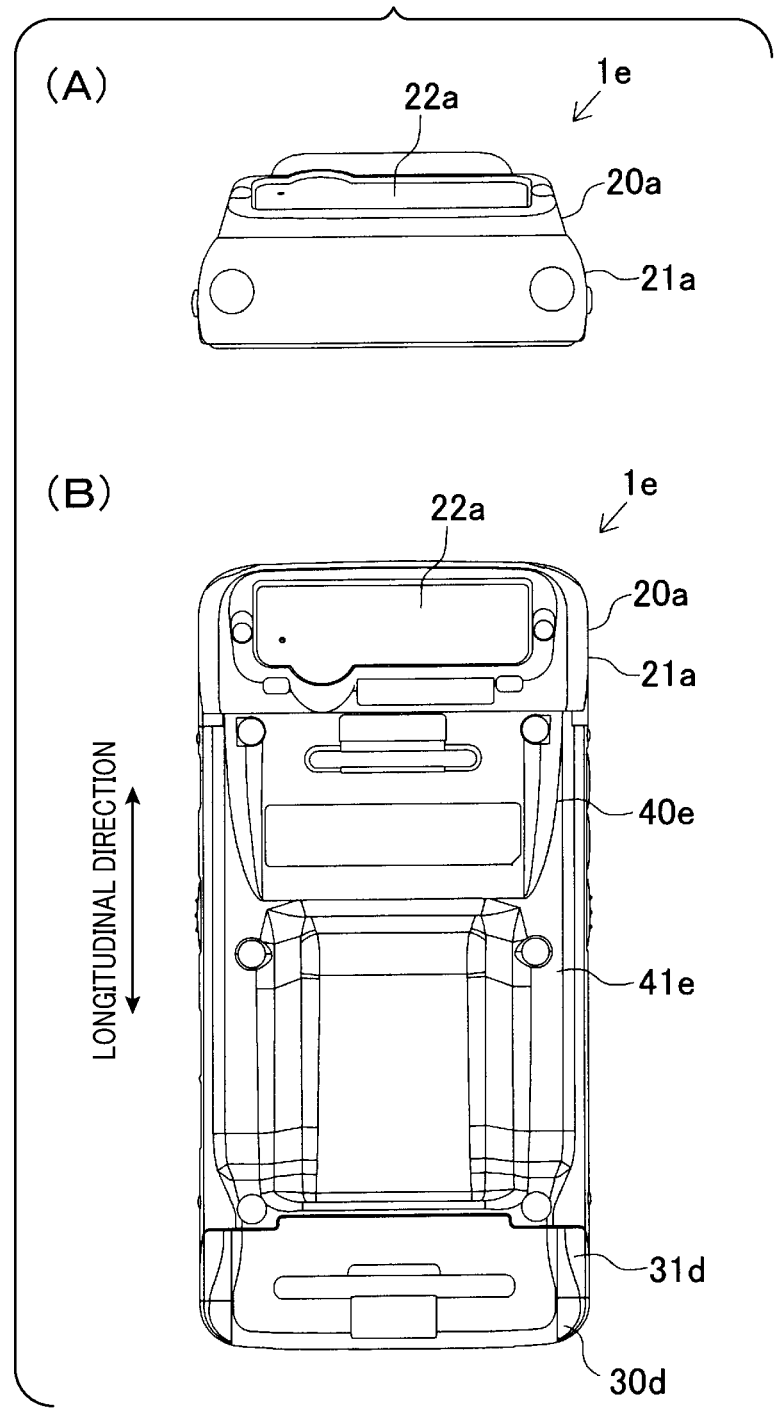
FIG. 20 illustrates an assembled state of the information reading apparatus 1e of FIG. 19, in which a part (A) of FIG. 20 is a rear view and a part (B) of FIG. 20 is a bottom view.
Figure 21:
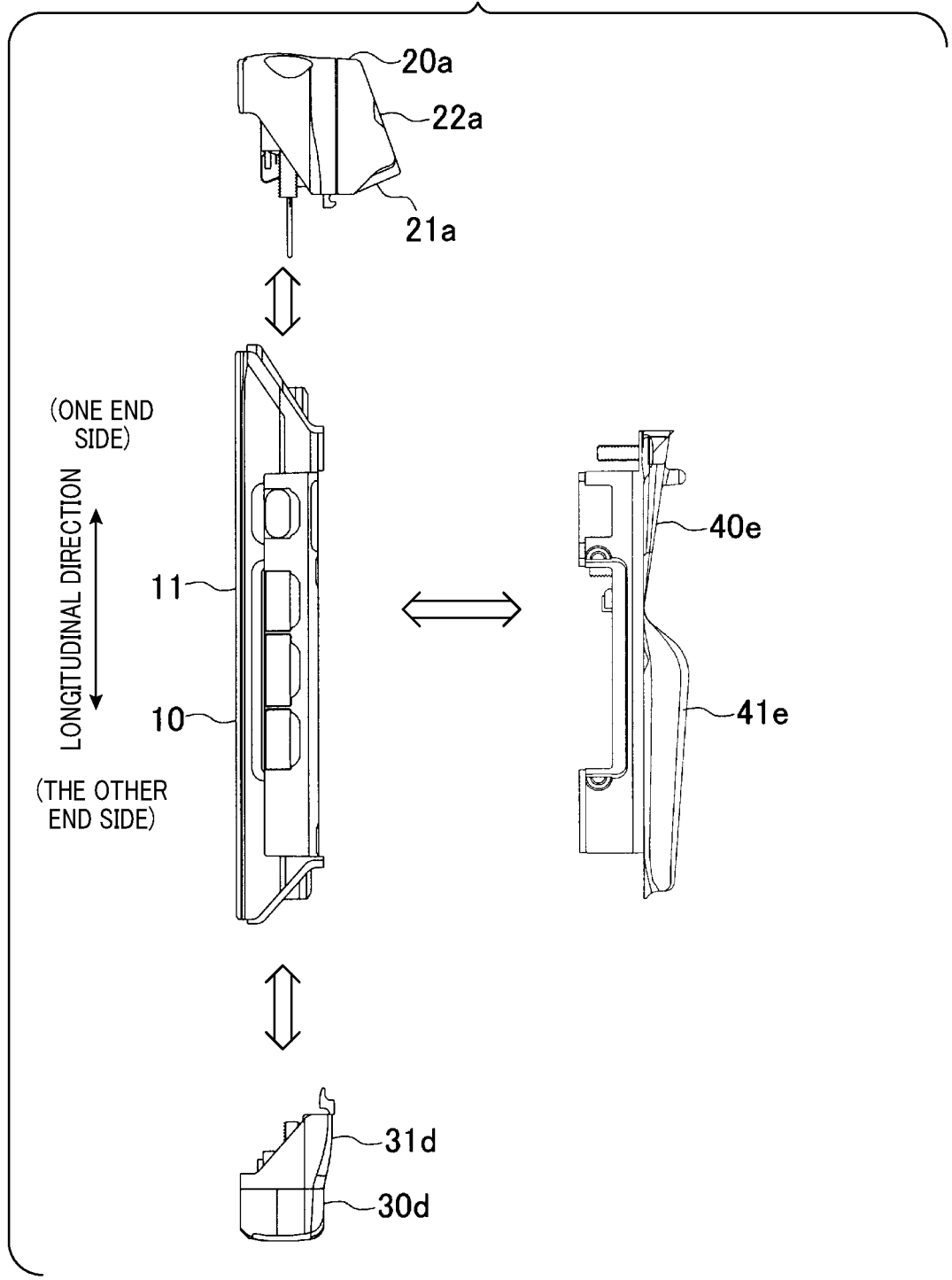
FIG. 21 is an exploded view of the information reading apparatus 1e of FIG. 19.
Figure 22:
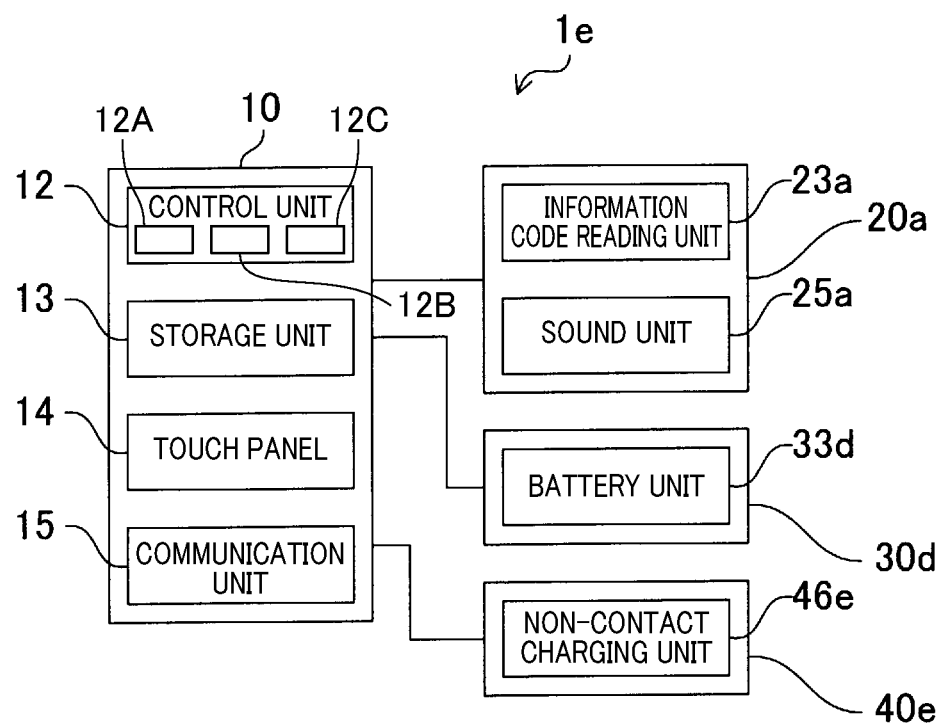
FIG. 22 is a block diagram schematically showing an electric configuration of the information reading apparatus 1e of FIG. 19.

Thus, as shown in FIGS. 19 to 21, the top module 20a, the bottom module 30d, and the back module 40e configured as described above are detachably assembled to the one end in the longitudinal direction, the other end in the longitudinal direction, and the rear side of the base module 10 to form the information reading apparatus 1e. In assembly of these components, as shown in FIG. 22, the information code reading unit 23a and the sound unit 25a of the top module 20a, the non-contact charging unit 46e of the back module 40a, and other members are connected to the unit 12 via a connector or another member. Further, the battery unit 33d of the bottom module 30d is connected to the control unit 12 and various electric components of the respective modules so as to be able to supply power.

In the information reading apparatus 1e configured as described above, when the power is applied, the control unit 12 recognizes the imparted function or the like on the basis of a signal from the information code reading unit 23a and the sound unit 25a of the top module 20a, the battery unit 33d of the bottom module 30d, and the non-contact charging unit 46e of the back module 40e in the same manner as the information reading apparatus 1a.

Then, an application program for implementing the recognized function is displayed on the display screen 14a in a selectable manner. Further, when any of the functional modules is not connected, it is displayed on the display screen 14a as a first notification to notify that the module is in a connection failure state.

As described above, in the information reading apparatus according to the present embodiment, the base module 10 includes the control unit 12 which performs control by using three functional modules assembled thereto, that is, the top module, the bottom module, and the back module, and the touch panel 14 whose display content is controlled by the control unit 12. The top module is connected to the one end of the base module 10 in the longitudinal direction, the bottom module is connected to the other end of the base module 10 in the longitudinal direction, and the back module is connected to the rear side of the base module 10, which faces away from the display screen 14a of the touch panel 14. The control unit 12 recognizes each function on the basis of the information obtained from the three functional modules connected to the base module 10.

Thus, the three functional modules each having a function appropriate for the intended situation are connected to the base module 10 such that a predetermined function or the like corresponding to the connected functional module is controlled by the control unit. In particular, the functional modules and a plurality of application programs provided for implementation of respective functions can be designed based on a common design idea, and thus operation methods, key arrangement, display content during operation, and the like can be readily commonized. Accordingly, an information reading apparatus that is easy for a user to operate even if different functions are required for each situation can be achieved.

Further, when the power is applied, the control unit 12 recognizes each function on the basis of the information obtained from the three functional modules connected to the base module 10. Since the power is usually applied after the respective functional modules are connected to the base module 10, functions of the connected functional modules can be reliably recognized.

In particular, in the information reading apparatus 1c, the control unit 12 receives external information from the RF tag processing unit 26c when the external information is read by the RF tag processing unit 26c, without providing instruction to the RF tag processing unit 26c. Thus, once the control unit 12 first recognizes the RF tag processing unit 26c, subsequent instructions to the RF tag processing unit 26c are not necessary. Accordingly, load on communication processing by the control unit 12 can be reduced.

Further, the control unit 12 controls display content of the display screen 14a to perform first notification when connection of at least one of the top module, the bottom module, and the back module to the base module 10 is not recognized. Accordingly, when the first notification is performed via the display screen 14a, a connection failure state, in which at least one of the top module, the bottom module, and the back module is not connected to the base module 10, can be easily recognized, and the connection failure can be immediately removed. Further, the first notification is not limited to the use of the display content of the display screen 14a, but may also be performed by using other functions of the base module 10, for example, by using a predetermined light emission state of an LED as the notification unit.

Furthermore, the control unit 12 may control the display content of the display screen 14a to perform second notification when the function imparted by the top module (step S42 in FIG. 4), the function imparted by the bottom module, and the function imparted by the back module becomes a combination of predetermined functions (step S41 in FIG. 4).

Specifically, an incompatible combination that should be excluded, for example, a case where a reading function imparted by the top module and a reading function imparted by the back module interfere with each other, is set as the combination of predetermined functions and pre-stored in the storage unit 13. When the combination that should be excluded is recognized by the control unit 12, the second notification is displayed on the display screen 14a to notify that the combination should be excluded. Accordingly, in repair and replacement, even if the functional modules are erroneously connected to the base module 10 as the combination that should be excluded, the combination that should be excluded can be easily recognized and immediately removed since the second notification is displayed. Further, the second notification is not limited to the use of the display screen 14a, but may also be performed by using other functions of the base module 10, for example, light emission state of an LED.

Further, the control unit 12 controls the display screen 14a of the touch panel 14 to display the application program for performing the recognized function in a selectable manner and not to display the application program for performing the unrecognized function among the plurality of application programs stored in the storage unit 13 in an executable manner (step S51 in FIG. 4). Thus, since the application program for performing a function different from a function imparted by the connected functional module is not displayed on the display screen 14a, erroneous operation is prevented for improved operability.

Second Embodiment

With reference to the drawings, an information reading apparatus according to a second embodiment will be described.

The second embodiment differs from the first embodiment mainly in that a plurality of functional modules including at least a first functional module and a second functional module are each connected to the base module mutually detachably or separably in terms of their mechanical and electrical connections. Therefore, components which are substantially the same as those of the first embodiment are denoted by the same reference signs, and the description thereof will be omitted.

The base module according to this embodiment is configured as a unit in which the function imparted as the back module of the first embodiment is pre-incorporated. Accordingly, the information reading apparatus is configured such that the top module and the bottom module are connected to the base module as a first functional module and a second functional module, respectively, to impart a predetermined function.

Figure 23:
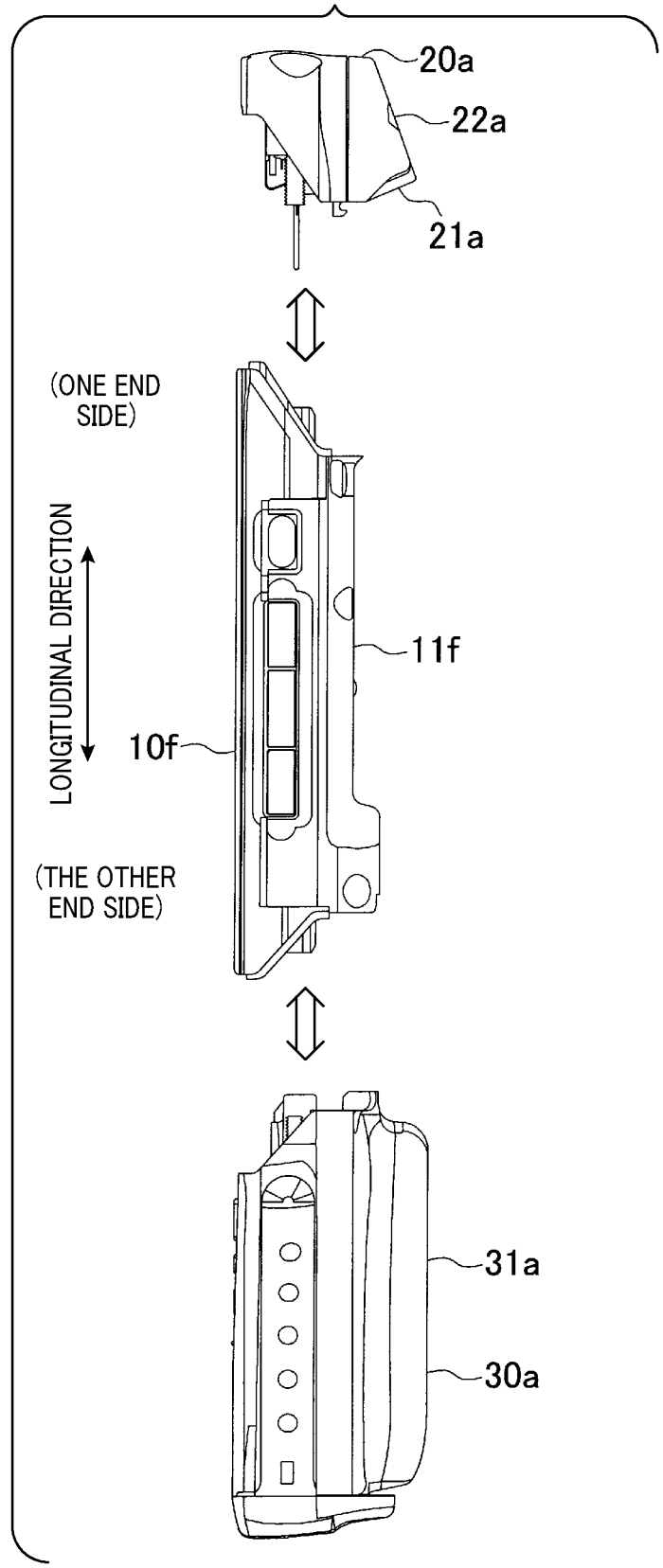
FIG. 23 is an exploded view of an information reading apparatus 1f of FIG. 19.
Figure 24:
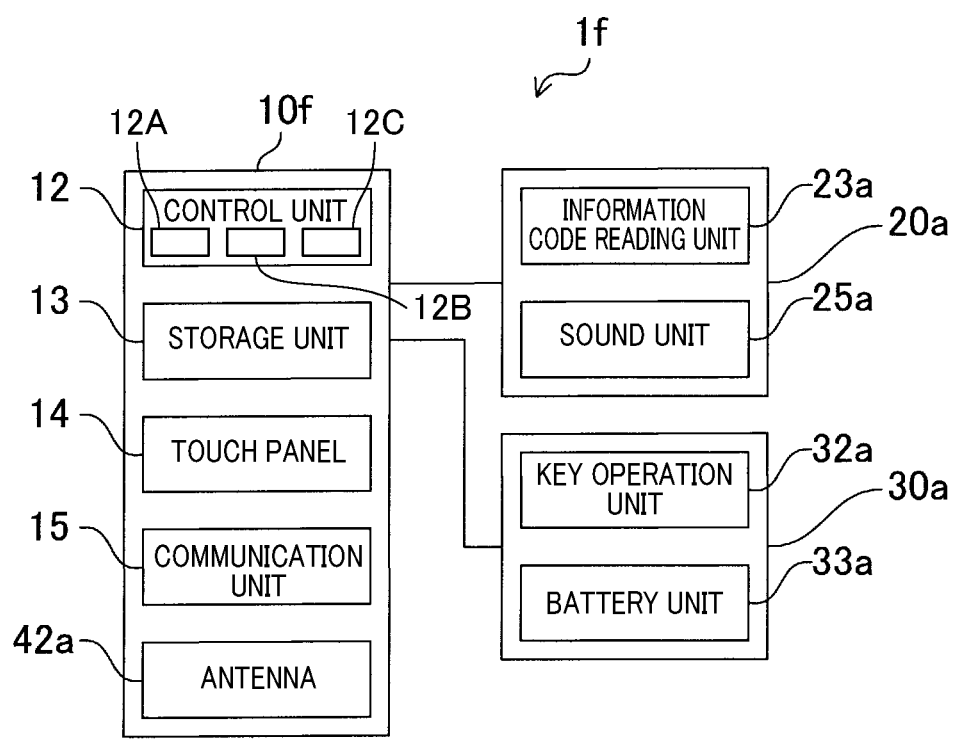
FIG. 24 is a block diagram schematically exemplifying an electric configuration of the information reading apparatus 1f of FIG. 23.

Specifically, as shown in FIG. 23, a base module 10f according to this embodiment is configured as a unit in which the function imparted as the back module 40a to the aforementioned base module 10 is pre-incorporated. A case 11f that forms the outer casing of the base module 10f is formed by integrating the above case 11 and the case 41a. The top module 20a and the bottom module 30a are each connected to the base module 10f to form an information reading apparatus 1f having a predetermined function as shown in FIG. 24.

In the information reading apparatus 1f configured as described above, when the power is applied, the control unit 12 transmits a predetermined signal to each of the two functional modules connected to the base module 10f, and recognizes a function or the like imparted by the connected functional module on the basis of a confirmation signal received (acquired) in response to the transmission.

When the top module 20a and the bottom module 30a are connected as described above, the control unit 12 recognizes the imparted function or the like on the basis of a signal from the information code reading unit 23a and the sound unit 25a of the top module 20a, and the key operation unit 32a and the battery unit 33a of the bottom module 30a.

Then, an application program for implementing the recognized function is displayed on the display screen 14a in a selectable manner. According to the above connection configuration, for example, an application program for reading an information code and an application program for using the sound unit 25a are displayed on the display screen 14a in a selectable manner. In the above connection configuration, for example, imparting of a function for reading an RF tag is not recognized. Accordingly, an application program for reading an RF tag is not displayed in a selectable manner on the display screen 14a.

Further, when one of the aforementioned top module 20b and the top module 20c, instead of the top module 20a, is connected to the base module 10f configured as described above, an information reading apparatus is provided with a function according to the connected top module imparted thereto. Further, when the aforementioned bottom module 30d, instead of the bottom module 30a, is connected to the base module 10f, an information reading apparatus is provided with a function according to the connected bottom module imparted thereto.

<First Modification>

Figure 25:
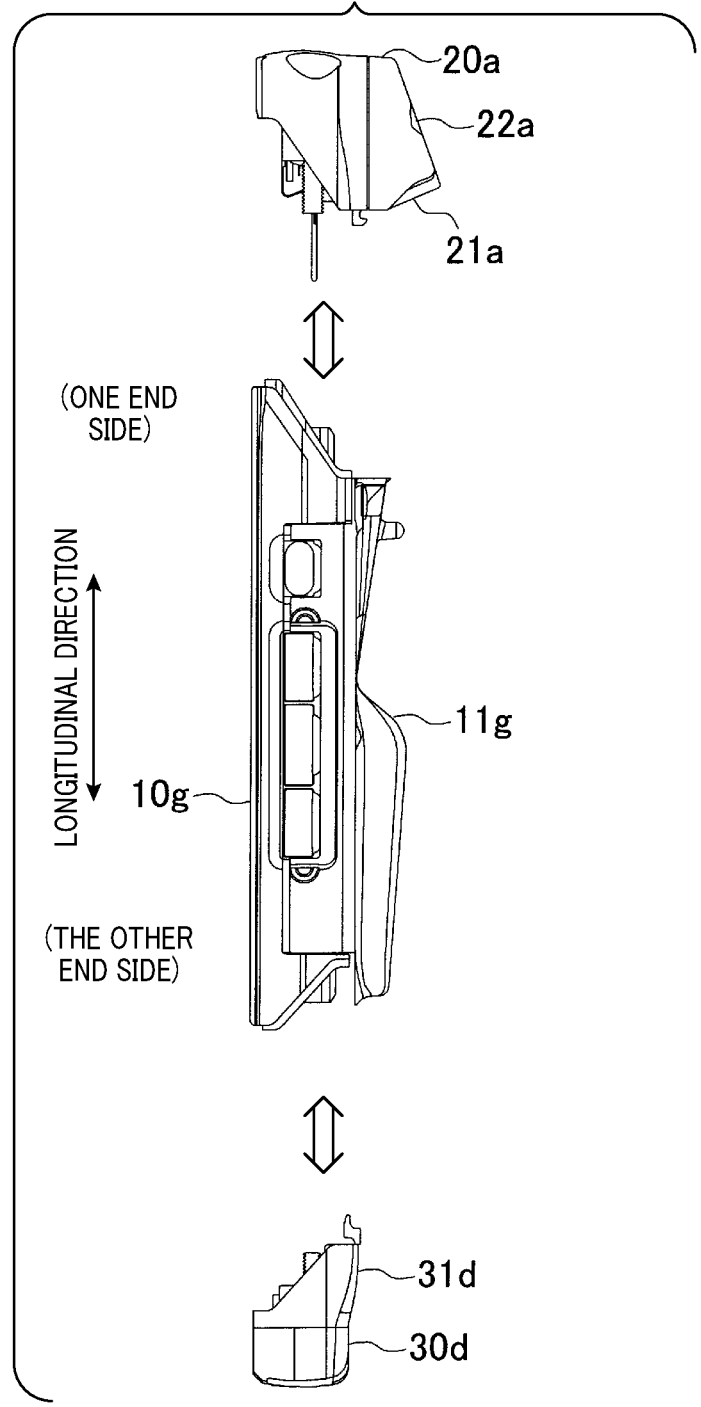
FIG. 25 is an exploded view of an information reading apparatus 1g of FIG. 19.
Figure 26:
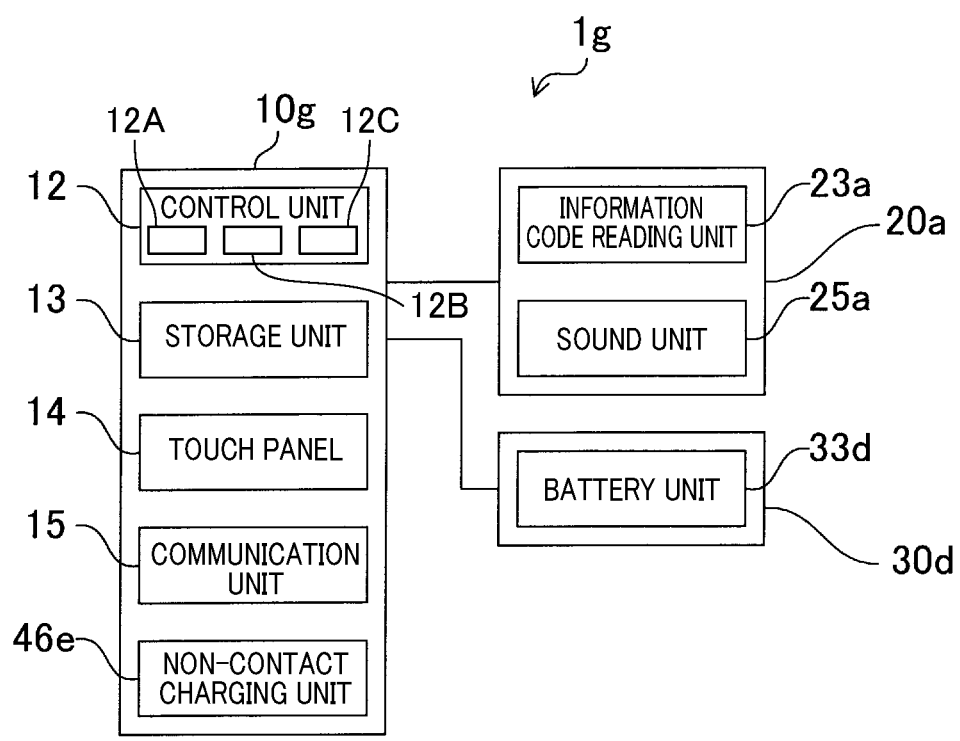
FIG. 26 is a block diagram schematically exemplifying an electric configuration of the information reading apparatus 1g of FIG. 25.

As a first modified example of the present embodiment, for example, as shown in FIG. 25, a base module 10g may be configured as a unit in which the function imparted as the back module 40e to the aforementioned base module 10 is pre-incorporated. A case 11g that forms the outer casing of the base module 10g is formed by integrating the above case 11 and the case 41e. The top module 20a and the bottom module 30d are each connected to the base module 10g to form an information reading apparatus 1g having predetermined functions as shown in FIG. 26.

In this configuration as well, the control unit 12 of the information reading apparatus 1g recognizes the function or the like imparted by the connected functional module, and performs processing to display an application program for implementing the recognized function in a selectable manner. Further, when one of the aforementioned top module 20b and the top module 20c, instead of the top module 20a, is connected to the base module 10g configured as described above, an information reading apparatus is provided with a function according to the connected top module imparted thereto. Further, when the aforementioned bottom module 30a, instead of the bottom module 30d, is connected to the base module 10g, an information reading apparatus is provided with a function according to the connected bottom module imparted thereto.

<Second Modification>

As a second modified example of the present embodiment, a base module may be configured as a unit in which the function imparted as the aforementioned bottom module is pre-incorporated. The information reading apparatus may be configured such that the top module and the back module are connected to the base module as a first functional module and a second functional module, respectively, to impart a predetermined function. Further, a base module may be configured as a unit in which the function imparted as the aforementioned top module is pre-incorporated. The information reading apparatus may be configured such that the bottom module and the back module are connected to the base module as a first functional module and a second functional module, respectively, to impart a predetermined function.

<Third Modification>

As a third modified example of the present embodiment, an information reading apparatus may be configured such that four or more functional modules including a first functional module and a second functional module are each connected to a base module having at least the control unit 12, and the control unit 12 recognizes each function on the basis of the information obtained from each of the functional modules to impart a predetermined function.

Figure 27:
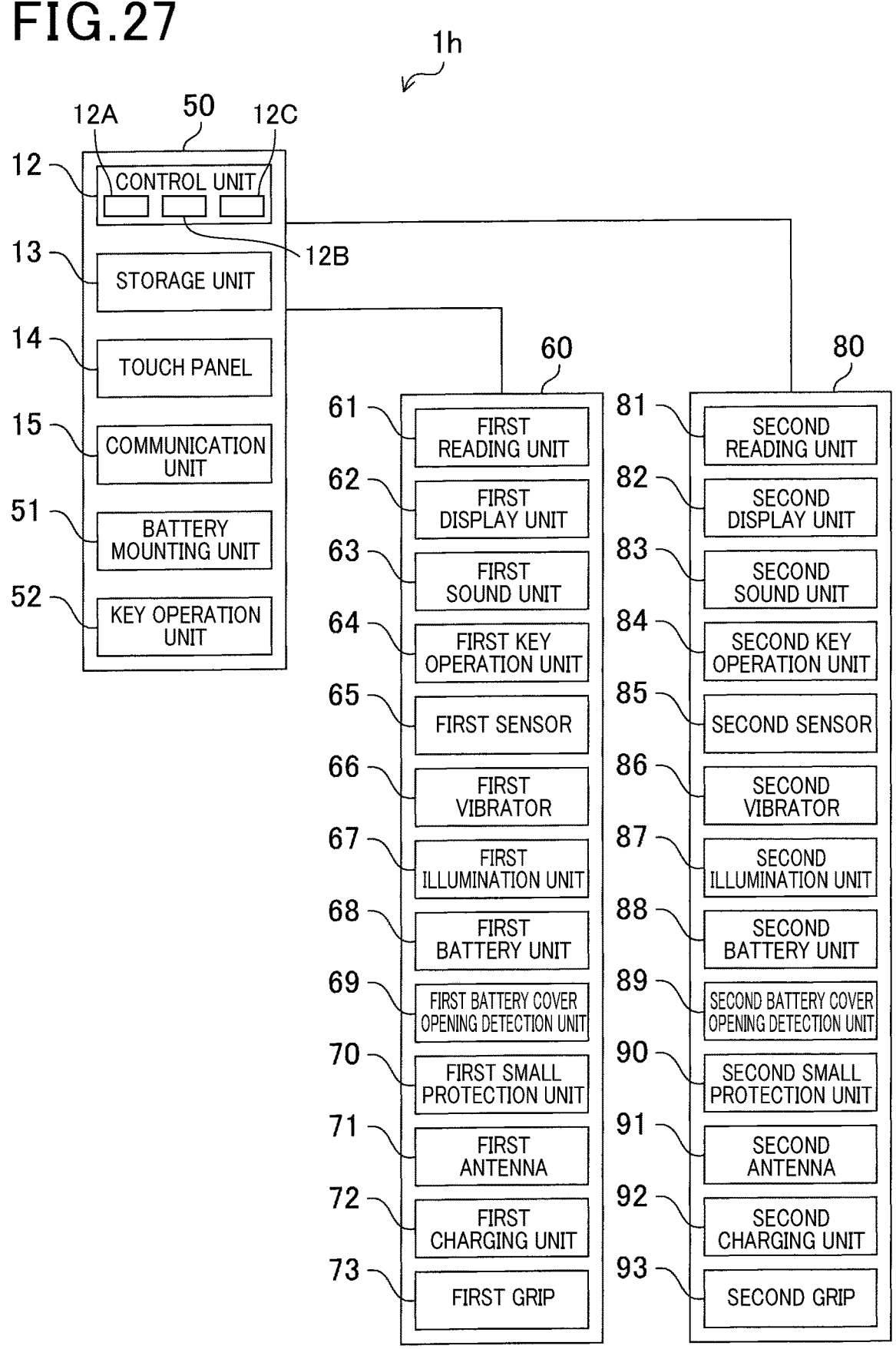
FIG. 27 is a block diagram schematically exemplifying an electric configuration of an information reading apparatus according to a third modified example of a second embodiment.

In this case, for example as shown in FIG. 27, a base module 50 of an information reading apparatus 1h according a third modified example may be configured to include a battery mounting unit 51 and a key operation unit (base module key operation unit) 52 in addition to the control unit 12, the storage unit 13, the touch panel (base module display unit) 14, the communication unit 15. Alternatively, the base module 50 according to the third modified example may be configured to include at least one of the storage unit 13, the touch panel 14, the communication unit 15, the battery mounting unit 51, and the key operation unit 52 in addition to the control unit 12.

Furthermore, as shown in FIG. 27, a first functional module 60 according to the third modified example may be configured to include a first reading unit 61 for reading external information, a first display unit 62, a first sound unit 63, a first key operation unit 64, a first sensor 65, a first vibrator 66, a first illumination unit 67, a first battery unit 68, a first battery cover opening detection unit 69, a first small protection unit 70, a first antenna 71, a first charging unit 72, and a first grip 73. Alternatively, the first functional module 60 according to the third modified example may be configured to include at least one of the first reading unit 61, the first display unit 62, the first sound unit 63, the first key operation unit 64, the first sensor 65, the first vibrator 66, the first illumination unit 67, the first battery unit 68, the first battery cover opening detection unit 69, the first small protection unit 70, the first antenna 71, the first charging unit 72, and the first grip 73.

Furthermore, as shown in FIG. 27, a second functional module 80 according to the third modified example may be configured to include a second reading unit 81 for reading external information, a second display unit 82, a second sound unit 83, a second key operation unit 84, a second sensor 85, a second vibrator 86, a second illumination unit 87, a second battery unit 88, a second battery cover opening detection unit 89, a second small protection unit 90, a second antenna 91, a second charging unit 92, and a second grip 93. Alternatively, the second functional module 80 according to the third modified example may be configured to include at least one of the second reading unit 81, the second display unit 82, the second sound unit 83, the second key operation unit 84, the second sensor 85, the second vibrator 86, the second illumination unit 87, the second battery unit 88, the second battery cover opening detection unit 89, the second small protection unit 90, the second antenna 91, the second charging unit 92, and the second grip 93.

For example, the reading unit including the first reading unit 61 and the second reading unit 81 may be configured like the information code reading unit 23*a* to read the information code C as external information, or may be configured like the RF tag processing unit 26*c* to read information recorded in the RF tag T as external information. Furthermore, the display unit including the first display unit 62 and the second display unit 82 may be configured like the touch panel 14 or the liquid crystal display so that display content thereof is controlled by the control unit 12.

Furthermore, the sound unit including the first sound unit 63 and the second sound unit 83 may be configured like the sound unit 25*a* to include at least one of a sound generation function such as a speaker and a sound collection function such as a microphone. Furthermore, the key operation unit including the first key operation unit 64 and the second key operation unit 84 may be configured to include at least one of a trigger key, a power supply key, a magic key, a case side key, a function key, a ten key, and the like, and output an operation signal corresponding to the key operation to the control unit 12.

Furthermore, the sensor including the first sensor 65 and the second sensor 85 may be configured like a proximity sensor or an illumination sensor to detect a state of a surrounding environment or an inside of the device and output a signal corresponding to the detected state to the control unit 12. Furthermore, the vibrator including the first vibrator 66 and the second vibrator 86 may be configured to vibrate at a predetermined pattern in response to a drive signal from the control unit 12.

Furthermore, the illumination unit including the first illumination unit 67 and the second illumination unit 87 may be configured as an LED or the like so that an illumination state of illumination light is controlled by the control unit 12. Further, the battery unit including the first battery unit 68 and the second battery unit 88 may be configured like the battery unit 33*a* and the battery unit 33*d* to supply power to each component constituting the information reading apparatus. Furthermore, the battery cover opening detection unit including the first battery cover opening detection unit 69 and the second battery cover opening detection unit 89 may be configured to output a detected signal to the control unit 12 when detecting the battery cover opening.

Furthermore, the small protection unit (smartphone design unit) including the first small protection unit 70 and the second small protection unit 90 may be configured to protect a portion connected to the base module so that a small case that forms the outer casing ensures the outer casing of the portion connected to the base module including the small case to form part of a substantially flat plate shape of a smartphone or a tablet. Furthermore, the antenna including the first antenna 71 and the second antenna 91 may be configured like the antenna 42*a* so that wireless communication via the antenna is performed by the communication unit 15 or the like that serves as an external interface. Furthermore, the charging unit including the first charging unit 72 and the second charging unit 92 may be configured like the non-contact charging unit 46*e* to perform non-contact charging or may be configured to perform charging via a connected terminal or the like.

Furthermore, the grip including the first grip 73 and the second grip 93 may be configured like the grip 43*c* as a gun type or may be configured as another type that can be easily gripped.

In the third modified example of this embodiment, some of the functional modules may be connected to the base module via wireless communication.

The present invention is not limited to the aforementioned embodiments and the like, and may also be embodied as described below.

(1) The information reading apparatus according to the first embodiment of the present disclosure is not limited to the configurations of the above-mentioned five information reading apparatuses 1*a* to 1*e*, and may be configured by connecting the top module, the bottom module, and the back module having other functions to the base module. For example, the top module may be configured to include a communication unit that reads and writes an IC card or the like by using a near field communication (NFC) function as the first reading unit.

Furthermore, the top module may be configured to include at least one of the information code reading unit 23*a* which serves as the first reading unit, the sound unit 25*a*, the top module key operation unit, the sensor, the top module vibrator, and the illumination unit. Furthermore, the bottom module may be configured to include the communication unit, the information code reading unit, the RF tag processing unit, and the like as the second reading unit. Furthermore, the bottom module may be configured to include at least one of the second reading unit, the key operation unit, the battery unit, the bottom module sound unit, the battery cover opening detection unit, and the small protection unit. Furthermore, the back module may be configured to include the communication unit, the information code reading unit, the RF tag processing unit, and the like as the third reading unit. Furthermore, the back module may be configured to include at least one of the third reading unit, the antenna, the charging unit, the grip, the back (rear) module battery unit, and the back module vibrator.

(2) The base module to which the top module, the bottom module, and the back module are connected is not limited to the configuration as the above-mentioned base module 10, and may also be configured to include other functions such as the sound unit, the battery mounting unit, and the base module key operation unit as long as it is configured to include a control unit that performs control by using the three functional modules and a display unit whose display content is controlled by the control unit. Further, the base module is not limited to the configuration that performs wireless communication by using an antenna disposed inside the case 11 or the antenna 42a of the connected back module 40a, and may be configured to perform wireless communication by using an antenna disposed in the top module or an antenna disposed in the bottom module.

PARTIAL REFERENCE NUMBER LIST 1a to 1e information reading apparatus
10 base module
12 control unit
13 storage unit
14 touch panel (display unit, notification unit)
15 communication unit
20a, 20b, 20c top module
23a, 23b information code reading unit (first reading unit)
25a sound unit
26c RF tag processing unit (first reading unit)
30a, 30d bottom module
32a key operation unit
33a, 33d battery unit
40a, 40c, 40e back (rear) module
42a antenna
43c grip
44c trigger key
45c large capacity battery unit
46e non-contact charging unit (charging unit)

What is claimed is:

1. An information reading apparatus comprising:
a base module; and
three functional modules that include a top module, a bottom module, and a back module, each configured to be detachably connected to the base module to impart a predetermined function to processing formed in the base module, wherein
the base module includes a control unit and a display unit, the control unit being configured to control the information reading apparatus in association with the functions imparted to the processing performed in the control unit, the display unit being configured to display contents controlled by the processing performed in the control unit,
the top module is detachably connected to one end of the base module in a longitudinal direction of the base module, the top module including at least one of a first reading unit for reading external information and a sound unit,
the bottom module is detachably connected to an other end of the base module in the longitudinal direction of the base module, the bottom module including at least one of a second reading unit for reading external information, a key operation unit, and a battery unit,
the back module is detachably connected to a rear side of the base module, which faces away from a display screen of the display unit, the back module including at least one of a third reading unit for reading external information, an antenna, a charging unit, and a grip, and
the control unit is configured to
determine whether or not a function imparted by the bottom module and a function imparted by the back module becomes an incompatible combination of the functions, and
perform a notification when the incompatible combination of the functions is determined.

2. The information reading apparatus according to claim 1, wherein
one of the first reading unit, the second reading unit, and the third reading unit serves as a wireless communication unit for reading external information by using wireless communication, and
the control unit receives the external information from the wireless communication unit when the external information is read by the wireless communication unit, without providing instruction to the wireless communication unit.

3. The information reading apparatus according to claim 2, further comprising a notification unit whose notification content is controlled by the control unit, wherein the control unit controls the notification unit to perform first notification when connection of at least one of the top module, the bottom module, and the back module to the base module is not recognized.

4. The information reading apparatus according to claim 3, wherein the control unit is configured to control the notification unit to perform the notification when the incompatible combination of the functions is determined.

5. The information reading apparatus according to claim 1, further comprising a storage unit in which a plurality of application programs for performing functions of the three functional modules connected to the base module are stored in a manner executable by the control unit, wherein the control unit controls the display unit to display an application program for performing the recognized function in a selectable manner and not to display an application program for performing an unrecognized function among the plurality of application programs.

6. The information reading apparatus according to claim 5, wherein the base module includes at least one of a battery mounting unit and a base module key operation unit in addition to the control unit and the display unit.

7. The information reading apparatus according to claim 6, wherein the top module includes at least one of the first reading unit, the sound unit, a top module key operation unit, a sensor, a top module vibrator, and an illumination unit.

8. The information reading apparatus according to claim 7, wherein the bottom module includes at least one of the second reading unit, the key operation unit, the battery unit, a bottom module sound unit, a battery cover opening detection unit, and a small protection unit.

9. The information reading apparatus according to claim 8, wherein the back module includes at least one of the third reading unit, the antenna, the charging unit, the grip, a back module battery unit, and a back module vibrator.

10. The information reading apparatus according to claim 1, wherein the base module includes at least one of a battery mounting unit and a base module key operation unit in addition to the control unit and the display unit.

11. The information reading apparatus according to claim 10, wherein the top module includes at least one of the first reading unit, the sound unit, a top module key operation unit, a sensor, a top module vibrator, and an illumination unit.

12. The information reading apparatus according to claim 11, wherein the bottom module includes at least one of the second reading unit, the key operation unit, the battery unit, a bottom module sound unit, a battery cover opening detection unit, and a small protection unit.

13. The information reading apparatus according to claim 12, wherein the back module includes at least one of the third reading unit, the antenna, the charging unit, the grip, a back module battery unit, and a back module vibrator.

14. The information reading apparatus according to claim 1, wherein the top module includes at least one of the first reading unit, the sound unit, a top module key operation unit, a sensor, a top module vibrator, and an illumination unit.

15. The information reading apparatus according to claim 14, wherein the bottom module includes at least one of the second reading unit, the key operation unit, the battery unit, a bottom module sound unit, a battery cover opening detection unit, and a small protection unit.

16. The information reading apparatus according to claim 15, wherein the back module includes at least one of the third reading unit, the antenna, the charging unit, the grip, a back module battery unit, and a back module vibrator.

17. The information reading apparatus according to claim 1, wherein the bottom module includes at least one of the second reading unit, the key operation unit, the battery unit, a bottom module sound unit, a battery cover opening detection unit, and a small protection unit.

18. The information reading apparatus according to claim 1, wherein the back module includes at least one of the third reading unit, the antenna, the charging unit, the grip, a back module battery unit, and a back module vibrator.

19. The information reading apparatus according to claim 1, wherein the control unit is configured to:
   i) transmit, to each of the three functional modules in response to power supply from the battery unit, an electrical signal showing whether each of the three functional modules are connected to the control unit,
   ii) receive a confirmation signal transmitted from each of the three functional, the confirmation signal being replied to transmission of the electrical signal,
   iii) recognize, based on the confirmation signal, function of at least one of the functional modules which are connected to the control unit, and
   iv) impart the recognized function to the functions of the control unit.

20. An information reading apparatus comprising:
   a base module; and
   a plurality of functional modules including at least a first functional module and a second functional module, each configured to be detachably connected to the base module to impart a predetermined function to processing performed in the base module, wherein
   the base module includes a control unit and at least one of a base module display unit whose display content is controlled by the control unit, a battery mounting unit, and a base module key operation unit, the control unit being configured to control the information reading apparatus in association with the functions imparted to the processing performed in the control unit,
   the first functional module is detachably connected to the base module, and includes at least one of a first reading unit for reading external information, a first display unit, a first sound unit, a first key operation unit, a first sensor, a first vibrator, a first illumination unit, a first battery unit, a first battery cover opening detection unit, a first small protection unit, a first antenna, a first charging unit, and a first grip,
   the second functional module is detachably connected to the base module, and includes at least one of a second reading unit for reading external information, a second display unit, a second sound unit, a second key operation unit, a second sensor, a second vibrator, a second illumination unit, a second battery unit, a second battery cover opening detection unit, a second small protection unit, a second antenna, a second charging unit, and a second grip, and
   the control unit is configured to
      determine whether or not functions imparted by the first and second functional modules become an incompatible combination of the functions, and
      perform a notification when the incompatible combination of the functions is determined.

* * * * *